United States Patent
Foucher et al.

(10) Patent No.: US 6,525,136 B1
(45) Date of Patent: *Feb. 25, 2003

(54) PHOTOCHROMIC CORE AND SHELL MATRIX

(75) Inventors: Daniel A. Foucher, Toronto (CA); Jaan Noolandi, Mississauga (CA); James H. Sharp, Burlington (CA)

(73) Assignee: Xerox Corporation, Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/920,926

(22) Filed: Aug. 2, 2001

(51) Int. Cl.[7] .................. C08L 53/00; C08L 35/00; C08L 88/00; C08F 48/00; G03G 9/00
(52) U.S. Cl. ..................... 525/88; 525/89; 525/148; 523/221; 430/120; 430/108.1
(58) Field of Search .................. 525/88, 89, 148, 525/902; 523/201; 430/120, 108.1

(56) References Cited

U.S. PATENT DOCUMENTS

| | | | |
|---|---|---|---|
| 5,551,973 A | 9/1996 | Oliver et al. | 106/22 B |
| 5,593,486 A | 1/1997 | Oliver et al. | 106/22 A |
| 5,633,109 A | 5/1997 | Jennings et al. | 430/115 |
| 5,710,420 A | 1/1998 | Martin et al. | 235/487 |
| 5,759,729 A | 6/1998 | Martin et al. | 430/106 |
| 5,952,131 A | 9/1999 | Kumacheva et al. | 430/21 |
| 6,214,500 B1 | 4/2001 | Kumacheva et al. | 430/21 |
| 6,365,312 B1 * | 4/2002 | Foucher et al. | 430/120 |

OTHER PUBLICATIONS

Foucher et al., "Photochromic Gyricon Display," U.S. application No. 09/864,386 (Attorney Docket No. D/99674) filed on May 24, 2001.
Foucher et al., "Photochromic Electrophoretic Ink Display," U.S. application No. 09/864,902 (Attorney Docket No. D/99674Q) filed on May 24, 2001.
Foucher et al., "Marking Particles," U.S. application No. 09/864,475 (Attorney Docket No. D/99674Q1) filed on May 24, 2001.
Foucher et al., "Marking Particles," U.S. application No. 09/864,535 (Attorney Docket No. D/99674Q2) filed on May 24, 2001.
James T.C. Wojtyk, Peter M. Kazmaier, and Erwin Buncel, "Effects of Metal Ion Complexion on the Spiropyran–Merocyanine Interconversion: Development of a Thermally Stable Photo–Switch", Chem. Commun. 1998, p. 1703.

* cited by examiner

Primary Examiner—James J. Seidleck
Assistant Examiner—Olga Asinovsky
(74) Attorney, Agent, or Firm—Judith L. Byorick

(57) ABSTRACT

Disclosed is a composition comprising a matrix which comprises particles comprising a core resin and a shell resin thereover, wherein at least one of the core resin and the shell resin contains a chelating agent and a spiropyran compound of the formula

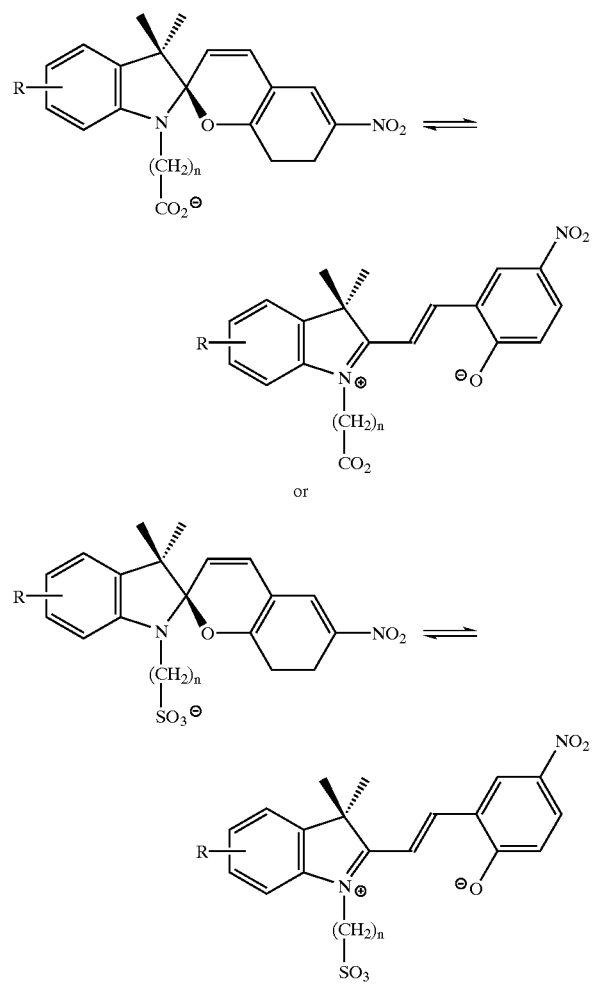

wherein n is an integer representing the number of repeat $-CH_2-$ units and R is $-H$ or $-CH=CH_2$, wherein the shell resin is the continuous phase of the matrix, wherein the spiropyran compound can produce changes in the optical and photoactive properties of the resin containing the spiropyran when irradiated.

22 Claims, 1 Drawing Sheet

PHOTOCHROMIC CORE AND SHELL MATRIX

Copending Application U.S. Ser. No. 09/864,386, filed May 24, 2001. entitled "Photochromic Gyricon Display," with the named inventors Daniel A. Foucher, Raj D. Patel, Naveen Chopra, Peter M. Kazmaier, Erwin Buncel, and James Wojtyk, the disclosure of which is totally incorporated herein by reference, discloses a display comprising an arrangement of a plurality of optically anisotropic rotatable elements, each of said rotatable elements having a surface in contact with an enabling fluid, said rotatable elements being electrically dipolar in the presence of the enabling fluid and thus being subject to rotation upon application of an electric field, said rotatable elements being free to rotate in place but not free to translate substantially so as to disrupt the arrangement of rotatable elements, wherein a first portion of said surface contains a mixture of a chelating agent and a spiropyran material of the formula

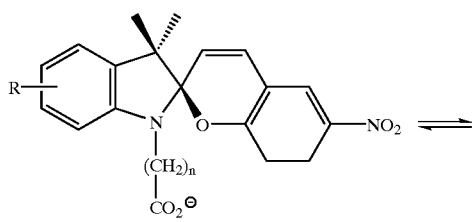

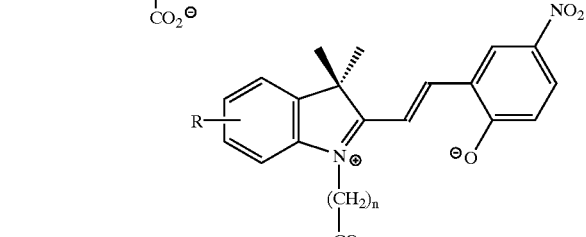

or

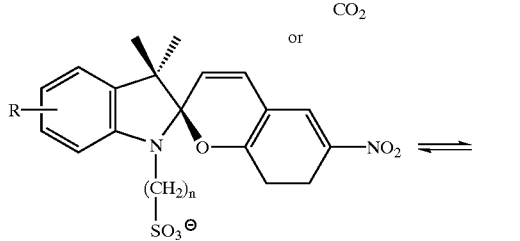

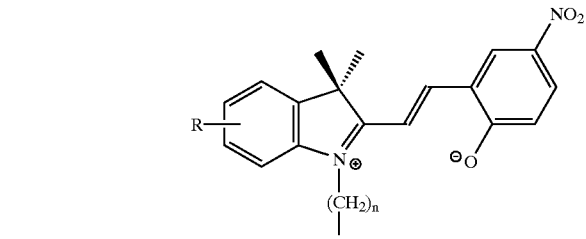

wherein n is an integer representing the number of repeat —$CH_2$— units and R is —H or —$CH=CH_2$, and wherein a second portion of said surface contains substantially no spiropyran.

Copending Application U.S. Ser. No. 09/864,902, filed May 24, 2001, entitled "Photochromic Electrophoretic Ink Display," with the named inventors Daniel A. Foucher, Raj D. Patel, Naveen Chopra, Peter M. Kazmaier, Erwin Buncel, and James Wojtyk, the disclosure of which is totally incorporated herein by reference, discloses an electrophoretic ink comprising a suspending fluid and, suspended in the suspending fluid, a plurality of particles comprising a mixture of a chelating agent and a spiropyran material of the formula

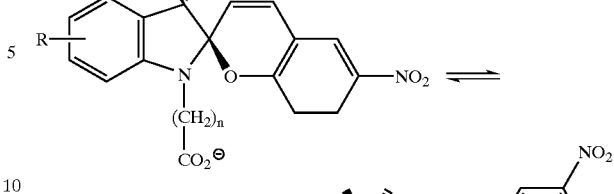

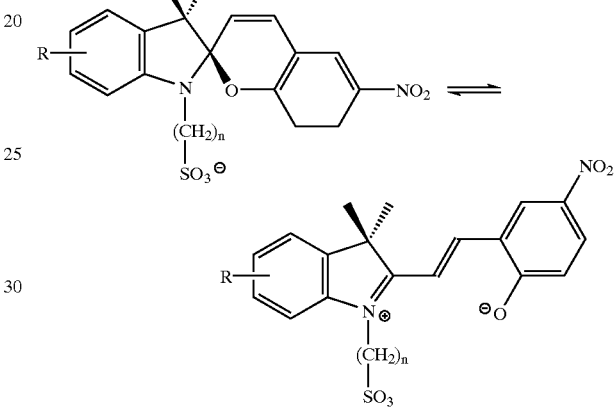

wherein n is an integer representing the number of repeat —$CH_2$— units and R is —H or —$CH=CH_2$, said particles being free to migrate within said suspending fluid under the influence of an electric field.

Copending Application U.S. Ser. No. 09/864,475, filed May 24, 2001, entitled "Marking Particles," with the named inventors Daniel A. Foucher, Raj D. Patel, Naveen Chopra, Peter M. Kazmaier, Erwin Buncel, and James Wojtyk, the disclosure of which is totally incorporated herein by reference, discloses marking particles comprising a first polymer, a second polymer, a chelating agent, and a spiropyran material of the formula

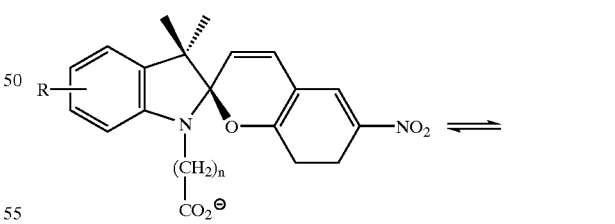

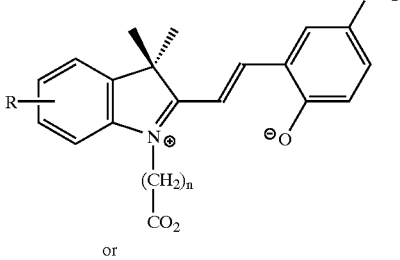

or

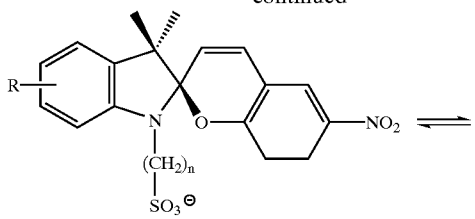

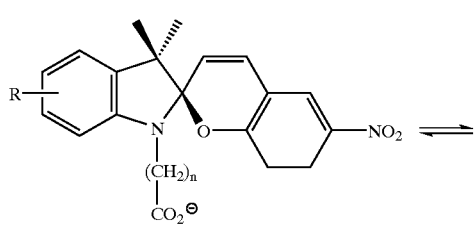

wherein n is an integer representing the number of repeat —CH$_2$— units and R is —H or —CH=CH$_2$. The marking particles comprise a core containing the first polymer in which is dispersed the chelating agent and the spiropyran and encapsulated within a shell of the second polymer formulated by an interfacial polymerization.

Copending Application U.S. Ser. No. 09/864,535, filed May 24, 2001, entitled "Marking Particles," with the named inventors Daniel A. Foucher, Raj D. Patel, Naveen Chopra, and Peter M. Kazmaier, the disclosure of which is totally incorporated herein by reference, discloses marking particles comprising a resin, a chelating agent, and a spiropyran material which is of the formula

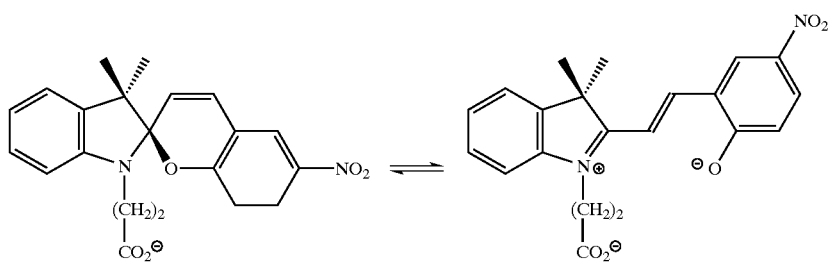

or

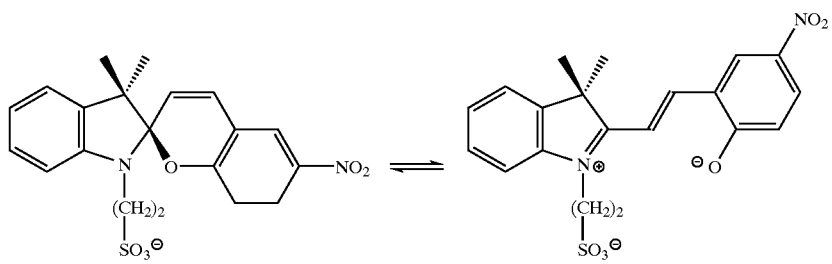

The marking particles are prepared by an emulsion aggregation process.

BACKGROUND OF THE INVENTION

The present invention is directed to processes for the preparation of photochromic high density storage media and imaging processes therewith. More specifically, the present invention is directed to compositions and processes for the preparation of optically addressable, high density, three-dimensional photochromic storage media for use in, for example, digital recording media and processes. One embodiment of the present invention is directed to a matrix composition which: comprises (a) a discrete phase comprising an ordered array of core particles containing a first resin, and (b) an annealed continuous phase comprising a second resin, wherein at least one of the first resin and the second resin contains a chelating agent and a spiropyran compound of the formula

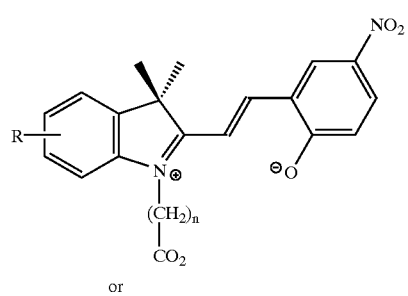

or

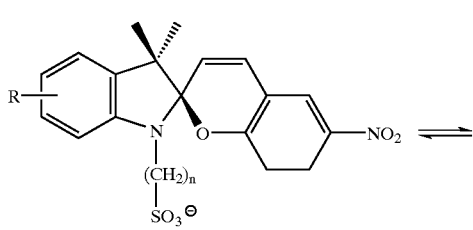

-continued

-continued

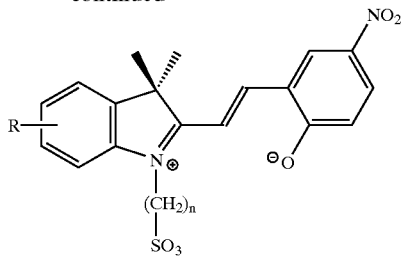

wherein n is an integer representing the number of repeat —CH$_2$— units and R is —H or —CH=CH$_2$, wherein if the spiropyran compound is irradiated then the optical properties of the resin containing the spiropyran compound change. Another embodiment of the present invention is directed to a composition comprising a matrix which comprises particles comprising a core resin and a shell resin thereover, wherein at least one of the core resin and the shell resin contains a chelating agent and a spiropyran compound of the formula

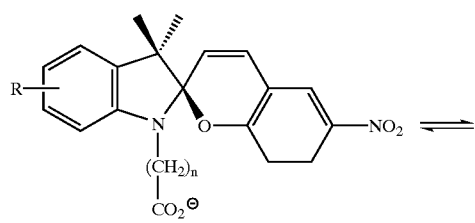

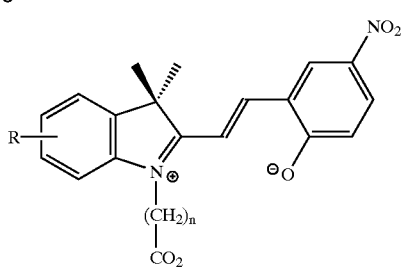

or

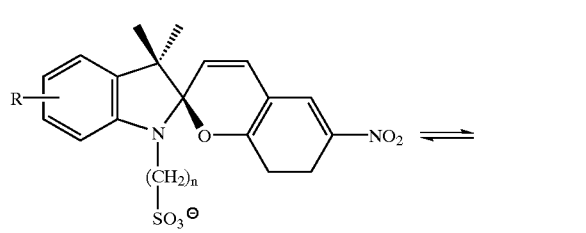

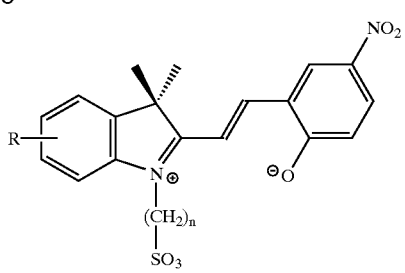

wherein n is an integer representing the number of repeat —CH$_2$— units and R is —H or —CH=CH$_2$, wherein the shell resin is the continuous phase of the matrix, wherein the spiropyran compound can produce changes in the optical and photoactive properties of the resin containing the spiropyran when irradiated. Yet another embodiment of the present invention is directed to a process which comprises (a) organizing into an array particles comprising a core resin and a shell resin, wherein at least one of the core resin and the shell resin contains a chelating agent and a spiropyran compound of the formula

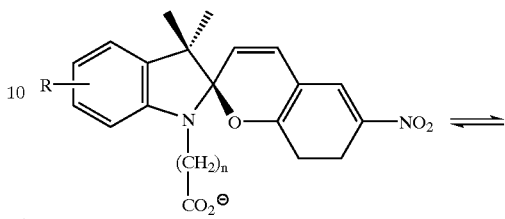

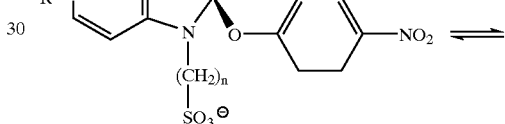

or

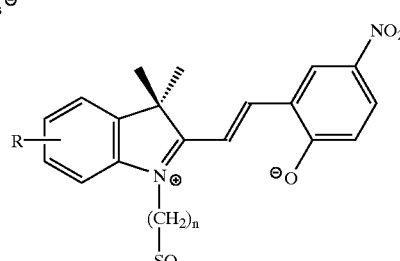

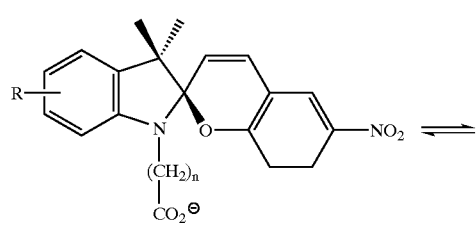

wherein n is an integer representing the number of repeat —CH$_2$— units and R is —H or —CH=CH$_2$; and (b) heating the array to cause the shell resin to melt, partially flow, then harden on cooling, to fix the particles into a storage medium comprising the particles as a discrete phase and the shell resin as a continuous phase. Still another embodiment of the present invention is directed to a process which comprises fusing an array of particles comprising a core resin with a shell resin thereover to fix the particles into a matrix, wherein at least one of the core resin and the shell resin contains a chelating agent and a spiropyran compound of the formula

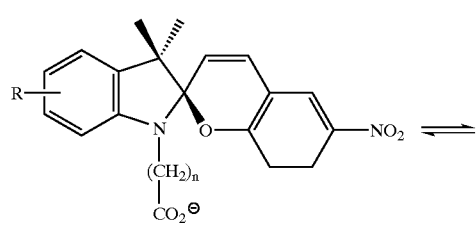

-continued

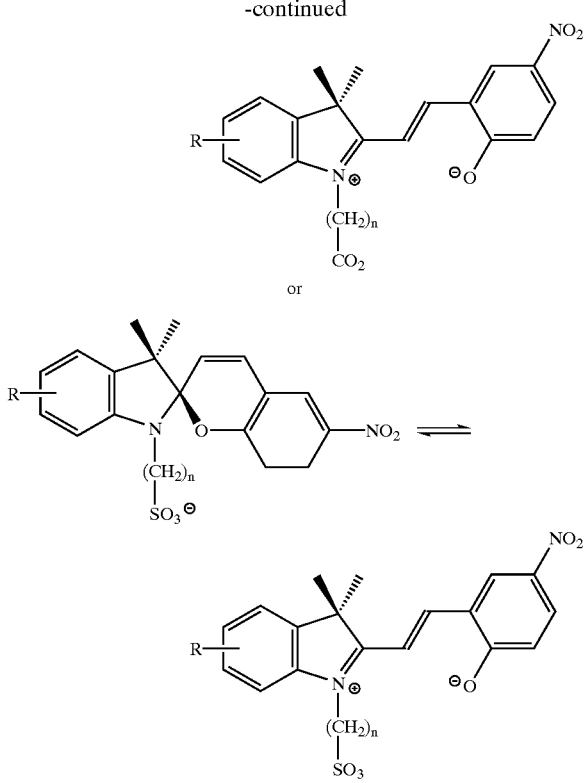

wherein n is an integer representing the number of repeat —$CH_2$— units and R is —H or —CH=$CH_2$, and wherein the core resin comprises a discrete phase and the shell resin comprises a continuous phase of the matrix.

Photochromism in general is a reversible change of a single chemical species between two states having distinguishably different absorption spectra, wherein the change is induced in at least one direction by the action of electromagnetic radiation. The inducing radiation, as well as the changes in the absorption spectra, are usually in the ultraviolet, visible, or infrared regions. In some instances, the change in one direction is thermally induced. The single chemical species can be a molecule or an ion, and the reversible change in states may be a conversion between two molecules or ions, or the dissociation of a single molecule or ion into two or more species, with the reverse change being a recombination of the two or more species thus formed into the original molecule or ion. Photochromic phenomena are observed in both organic compounds, such as anils, disulfoxides, hydrazones, oxazones, semicarbazones, stilbene derivatives, o-nitrobenzyl derivatives, spiro compounds, and the like, and in inorganic compounds, such as metal oxides, alkaline earth metal sulfides, titanates, mercury compounds, copper compounds, minerals, transition metal compounds such as carbonyls, and the like. Photochromic materials are known in applications such as photochromic glasses, which are useful as, for example, ophthalmic lenses.

U.S. Pat. No. 5,952,131 (Kumacheva et al.) and U.S. Pat. No. 6,214,500 (Kumacheva et al.), the disclosures of each of which are totally incorporated herein by reference, disclose a composition including a matrix which comprises particles comprising a core resin and a shell resin thereover, wherein the core resin contains a covalently bonded photosensitive compound, and wherein the shell resin is the continuous phase of the matrix.

U.S. Pat. No. 5,633,109 (Jennings et al.), the disclosure of which is totally incorporated herein by reference, discloses an ink composition which comprises an aqueous liquid vehicle, a photochromic material, and a vesicle-forming lipid, wherein vesicles of the lipid are present in the ink.

U.S. Pat. No. 5,551,973 (Oliver et al.), the disclosure of which is totally incorporated herein by reference, discloses an ink composition which comprises an aqueous phase, an oil phase, a, photochromic material, and a surfactant, said ink exhibiting a liquid crystalline gel phase at a first temperature and a liquid microemulsion phase at a second temperature higher than the first temperature.

U.S. Pat. No. 5,593,486 (Oliver et al.), the disclosure of which is totally incorporated herein by reference, discloses a hot melt ink composition comprising (a) an ink vehicle, said ink vehicle being a solid at about 25° C. and having a viscosity of from about 1 to about 20 centipoise at a temperature suitable for hot melt ink jet printing, said temperature being greater than about 45° C., (b) a photochromic material, (c) an optional colorant, and (d) an optional propellant.

U.S. Pat. No. 5,710,420 (Martin et al.), the disclosure of which is totally incorporated herein by reference, discloses a method of embedding and recovering machine readable information on a substrate which comprises (a) writing data in a predetermined machine readable code format on the substrate with a photochromic marking material having a first state corresponding to a first absorption spectrum and a second state corresponding to a second absorption spectrum; and (b) thereafter effecting a photochromic change in at least some of the photochromic marking material from the first state to the second state.

U.S. Pat. No. 5,759,729 (Martin et al.), the disclosure of which is totally incorporated herein by reference, discloses a toner composition for the development of electrostatic latent images which comprises particles comprising a mixture of a resin and a photochromic material. Another embodiment of the invention is directed to a liquid developer composition for the development of electrostatic latent images which comprises a nonaqueous liquid vehicle and a photochromic material, wherein the liquid developer has a resistivity of from about $10^8$ to about $10^{11}$ ohm-cm and a viscosity of from about 25 to about 500 centipoise. Yet another embodiment of the invention is directed to a liquid developer composition for the development of electrostatic latent images which comprises a nonaqueous liquid vehicle, a charge control agent, and toner particles comprising a mixture of a resin and a photochromic material.

James T. C. Wojtyk, Peter M. Kazmaier, and Erwin Buncel, "Effects of Metal Ion Complexation on the Spiropyran-Merocyanine Interconversion: Development of a Thermally Stable Photo-Switch," *Chem. Commun.* 1998, p. 1703, the disclosure of which is totally incorporated herein by reference, discloses spectrophotometric absorption and fluorescence measurements of spiropyrans

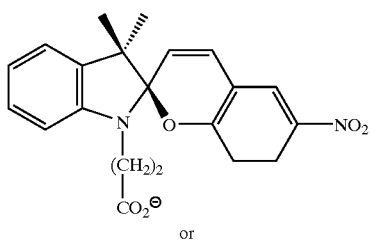

or

-continued

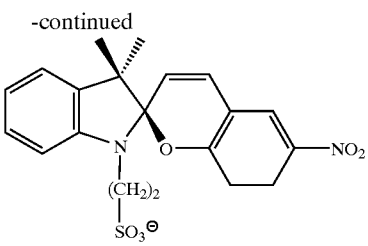

modified with chelating functionalities, in the presence of $Ca^{2+}$ and $Zn^{2+}$, that provide evidence of a thermally stable spiropyran-merocyanine photoswitch that is modulated by the metal cations.

While known compositions and processes are suitable for their intended purposes, a need remains for structures comprising nanoparticles, such as polymer encapsulated resin particles, that are ordered on a macroscopic scale, including thin film and two dimensional media and three-dimensional periodic arrays wherein the storage density is greatly enhanced. In addition, a need remains for media with improved efficiency, improved flexibility, and improved operational economies. Further, a need remains for imaging processes wherein a photosensitive compound is selectively and effectively addressed, thereby forming a stable three-dimensional image therein. Additionally, a need remains for storage media containing photochromic materials. There is also a need for photochromic storage media wherein both resonance forms of the photochromic material are stable. There is also a need for photochromic storage media wherein the two resonance forms of the photochromic material are addressable at different wavelengths. In addition, there is a need for photochromic storage media wherein both resonance forms of the photochromic material are stable for reasonable periods of time without the need for constant irradiation to maintain the resonance form. Further, there is a need for thermally stable photochromic storage media. Additionally, there is a need for photochromic storage media wherein the photochromic shift can be induced rapidly. A need also remains for photochromic storage media wherein the photochromic shift can be both induced rapidly and reversed rapidly.

SUMMARY OF THE INVENTION

The present invention is directed to a matrix composition which comprises (a) a discrete phase comprising an ordered array of core particles containing a first resin, and (b) an annealed continuous phase comprising a second resin, wherein at least one of the first resin and the second resin contains a chelating agent and a spiropyran compound of the formula

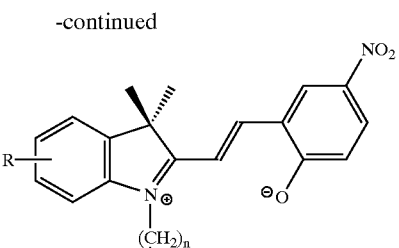

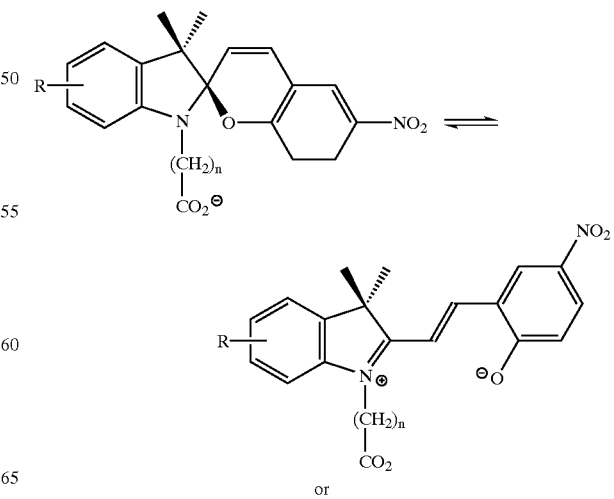

wherein n is an integer representing the number of repeat —$CH_2$— units and R is —H or —CH=$CH_2$, wherein if the spiropyran compound is irradiated then the optical, properties of the resin containing the spiropyran compound change. Another embodiment of the present invention is directed to a composition comprising a matrix which comprises particles comprising a core resin and a shell resin thereover, wherein at least one of the core resin and the shell resin contains a chelating agent and a spiropyran compound of the formula -continued

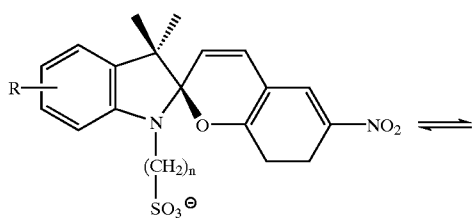

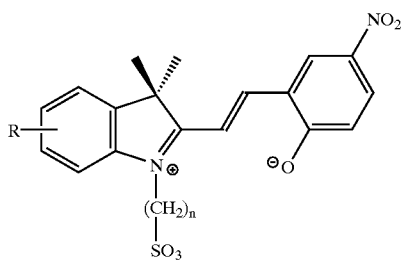

wherein n is an integer representing the number of repeat —CH₂— units and R is —H or —CH=CH₂, wherein the shell resin is the continuous phase of the matrix, wherein the spiropyran compound can produce changes in the optical and photoactive properties of the resin containing the spiropyran when irradiated. Yet another embodiment of the present invention is directed to a process which comprises (a) organizing into an array particles comprising a core resin and a shell resin, wherein at least one of the core resin and the shell resin contains a chelating agent and a spiropyran compound of the formula

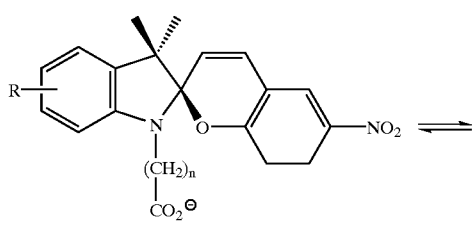

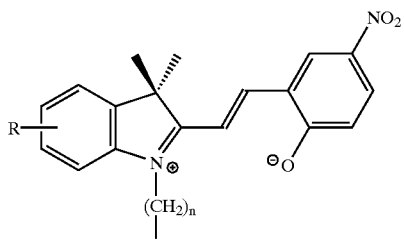

or

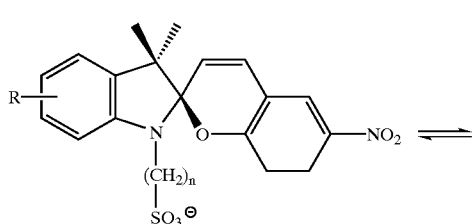

-continued

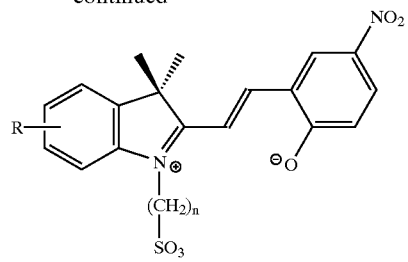

wherein n is an integer representing the number of repeat —CH₂— units and R is —H or —CH=CH₂; and (b) heating the array to cause the shell resin to melt, partially flow, then harden on cooling, to fix the particles into a storage medium comprising the particles as a discrete phase and the shell resin as a continuous phase. Still another embodiment of the present invention is directed to a process which comprises fusing an array of particles comprising a core resin with a shell resin thereover to fix the particles into a matrix, wherein at least one of the core resin and the shell resin contains a chelating agent and a spiropyran compound of the formula

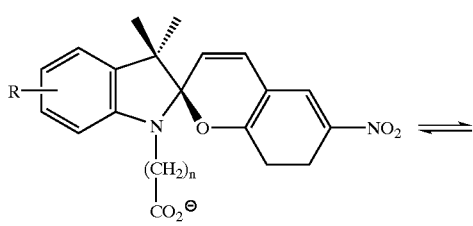

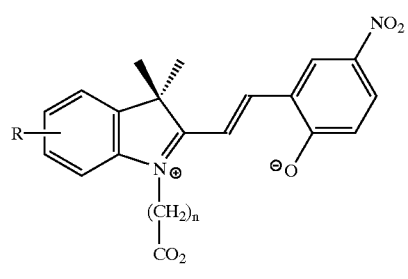

or

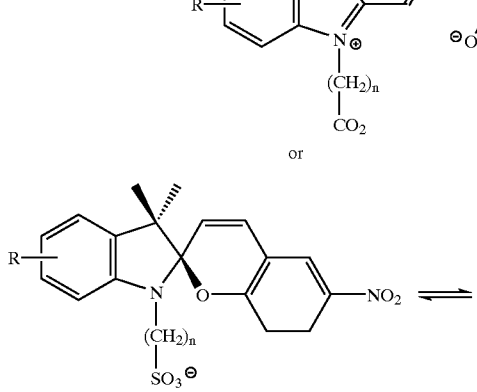

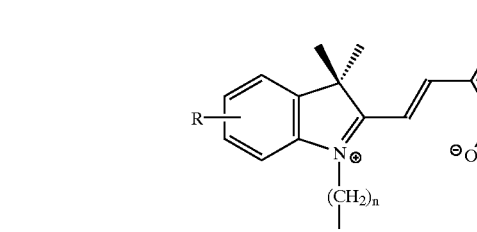

wherein n is an integer representing the number of repeat —CH₂— units and R is —H or —CH=CH₂, and wherein the core resin comprises a discrete phase and the shell resin comprises a continuous phase of the matrix.

DETAILED DESCRIPTION OF THE INVENTION

Figure 1:
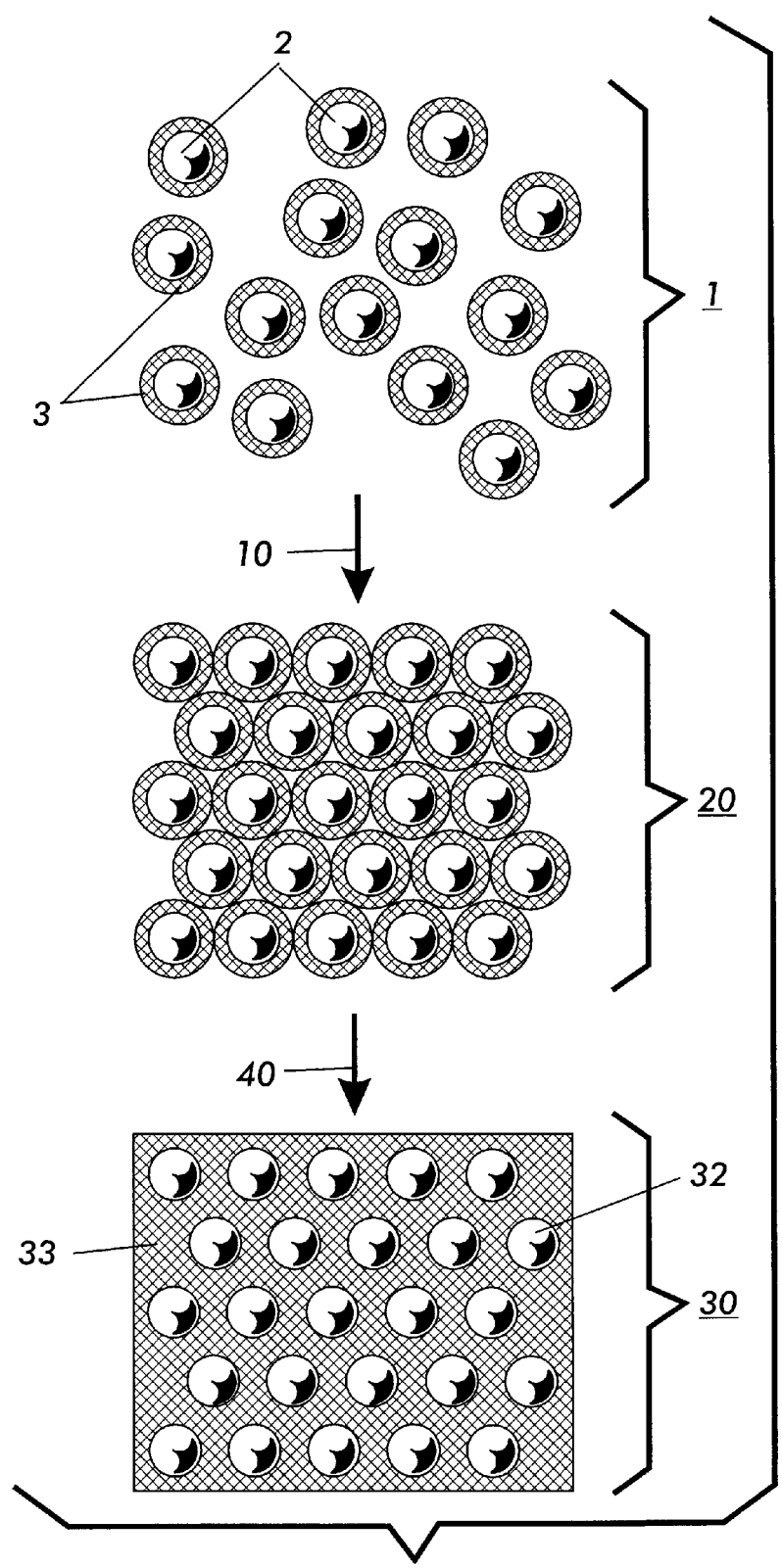
FIG. 1 shows a schematic for the formation of a three-dimensional ordered polymer structure of the present invention from core-shell latices.

The present invention is directed to a matrix composition which comprises (a) a discrete phase comprising an ordered array of core particles containing a first resin, and (b) an annealed continuous phase comprising a second resin, wherein at least one of the first resin and the second resin contains a chelating agent and a spiropyran compound according to the present invention. Another embodiment of the present invention is directed to a composition comprising a matrix which comprises particles comprising a core resin and a shell resin thereover, wherein at least one of the core resin and the shell resin contains a chelating agent and a spiropyran compound according to the present invention, wherein the shell resin is the continuous phase of the matrix.

Compositions, articles, and media according to the present invention can be prepared by, for example, a process which comprises (a) providing particles comprising a core resin and a shell resin, wherein at least one of the core resin and the shell resin contains a spiropyran and a chelating agent according to the present invention; (b) organizing the particles into a three-dimensional array; and (c) heating the array to melt the shell resin of the particles, thereby fixing the particles of the array into a high density storage medium.

The organizing can be performed by various known chemical and physical methods for reducing the bulk volume of latex suspension systems, such as concentration, evaporation, precipitation, aggregation, agglomeration, partial annealing, freeze drying, electrophoresis, acoustic setting (wherein sound waves are used to settle and densify particle packing), or the like, as well as combinations thereof. Organizing results in the formation of a close packed but loosely held (i.e. fragile) three-dimensional array of particles. The heating, which effectively anneals the three-dimensional array into a stable monolithic block, can be performed at any desired or effective temperature, typically from about 50 to about 110° C., and preferably from about 55 to about 100° C., although the temperature can be outside of these ranges, and for any desired or effective period of time, typically from about 30 minutes to about 12 hours, and preferably from about 30 minutes to about 2 hours, although the heating time can be outside of these ranges. The heating conditions can be selected based on, for example, the size of the sample, the glass transition temperature of the shell resin, the heat transfer properties of the containing vessel and the latex, the type and level of entrapped solvent(s), and like considerations which are readily evident to one of ordinary skill in the art.

Core-shell resin particles of the present invention can have any desired or effective average particle diameter, typically from about 100 to about 3,000 nanometers, and preferably from about 200 to about 2,000 nanometers, although the particle size can be outside of these ranges, and a polydispersity or a geometric size-distribution (GSD) typically of about 1.00 to about 1.10, although the polydispersity or GSD can be outside of this range.

The core resin can be any resin or mixture of resins which has a glass transition temperature that is greater than the glass transition temperature of the shell resin. When the spiropyran and chelating agent are present in the core resin, in one embodiment the core resin comprises a polymer that has incorporated therein a spiropyran compound according to the present invention in the polymer main chain; in another embodiment, the spiropyran compound is chemically appended to the main chain or a functional group attached to the main chain; in yet another embodiment, the spiropyran is dispersed within the core resin without being chemically bonded thereto. In all of these embodiments wherein the spiropyran is present in the core resin, the chelating agent is dispersed within the core resin. The particles can be a latex of an encapsulated polymer or copolymer wherein the core and shell resins are, for example, polymers such as styrene-butadienes, styrene acrylates, styrene methacrylates, polyesters, mixtures thereof, and like thermoplastic polymers. One example of a core resin is a homopolymer of poly(methyl methacrylate) prepared by emulsion polymerization of methyl methacrylate monomer.

The shell resin can be any resin or mixture of resins having a glass transition temperature less than the glass transition temperature of the core resin. One example of suitable shell resin is a copolymer obtained from the polymerization of methyl methacrylate and butyl methacrylate monomers. In one specific embodiment, the shell resin is selected so that the glass transition temperature ($T_g$) of the shell resin is at least about 20° C. lower than the glass transition temperature of the core resin. In another specific embodiment, the shell resin is selected so that the glass transition temperature of the shell resin is no more than about 80° C. lower than the glass transition temperature of the core resin.

The weight average molecular weight ($M_w$) of both the core resin and the shell resin typically is from about 15,000 to about 300,000, and preferably from about 15,000 to about 100,000, although the $M_w$ can be outside of these ranges. The weight ratio of the core resin to the shell resin typically is from about 1:1,000 to about 2.3:1, and preferably from about 1:100 to about 1.5:1, although the weight ratio of core resin to shell resin can be outside of these ranges.

In embodiments wherein the spiropyran and chelating agent are in the core resin, in one specific embodiment, the core resin is crosslinked and the spiropyran compound is chemically bound or otherwise permanently attached to the core resin to prevent substantial physical movement or migration of the spiropyran compound between the core and the shell. For example, a spiropyran monomer having a polymerizable functional group thereon can be copolymerized by any desired or effective method, such as free radical polymerization, condensation polymerization, or the like, along with conventional monomers in various amounts and thereafter crosslinked by known techniques. In another such embodiment, the spiropyran compound is admixed with the core resin but not covalently or otherwise permanently attached thereto, and the core resin is crosslinked in the presence of the spiropyran compound. In both of these embodiments, the chelating agent can be admixed with the core resin prior to crosslinking, or, if desired, admixed with the monomer precursors of the core resin prior to formation of the core polymer resin. Crosslinking the core polymer restricts or minimizes transport of the spiropyran compound from the core to the shell and thereby further enhances the structural and photoresponsive integrity of the display or storage medium containing the particles. The crosslinking agent can be present in the core resin in any desired or effective amount, typically from about 0.1 to about 2 molar percent, and preferably from about 0.5 to about 2.0 molar percent based on the total weight of the core resin, although the amount of crosslinking agent can be outside of these ranges.

The spiropyran and chelating agent can also be situated in the shell resin instead of in the core resin. Further, the spiropyran and chelating agent can be situated in both the core resin and the shell resin. In these embodiments, the spiropyran and chelating agent can be incorporated into the shell resin and the relative amounts of spiropyran, chelating agent, and shell resin are similar to those indicated hereinabove with respect to the embodiments wherein the spiropyran and chelating agent are situated in the core resin. In all of these embodiments wherein the spiropyran is present in the shell resin, the chelating agent is dispersed within the shell resin.

The core particles can be present in the storage medium in any desired or effective amount, typically from about 0.1 to about 70 weight percent based on the total weight of the medium, with the shell resin being present in amounts typically from about 30 to about 99.9 weight percent based on the total weight of the medium, although the relative amounts of core particles and shell resin can be outside of these ranges. It will be readily understood and appreciated that the three-dimensional recording media illustrated herein can also be readily adapted to systems of lower order and complexity, such as two dimensional and one dimensional configurations, wherein the writing and recording integrity is retained or improved upon compared to the three-dimensional configurations. The encapsulated resin particles of the compacted latex can be closely packed and can be present in concentrations typically from about $10^{11}$ to about $10^{14}$ particles per cubic centimeter, although the concentration can be outside of this range. In the matrix storage medium the concentration of particles may change substantially from the close packed particles in the first formed compact.

The present invention accordingly provides imaging compositions comprising a matrix which comprises particles comprising a core resin and a shell resin thereover, wherein either the core resin or the shell resin contains a spiropyran compound and a chelating agent according to the present invention, wherein each of the resin-encapsulated core particles is in a closely packed relationship with adjacent resin-encapsulated core particles, and wherein the adjacent particles are fixed within the matrix by attachment to adjacent or nearest neighboring particles through shell resin bridging or resin sharing between particles. Preferably, there are substantially no direct contacts between adjacent core particles.

The imaging compositions enable imaging processes comprising (a) a first irradiating of a composition comprising a matrix which comprises particles comprising a core resin and a shell resin thereover, wherein either the core resin or the shell resin contains a spiropyran compound and a chelating agent according to the present invention, wherein the particles are in a closely packed relationship with adjacent particles, and wherein the adjacent particles are physically attached thereto through shell resin bridging or sharing, such that the spiropyran compound is selectively and effectively addressed, thereby forming a stable three-dimensional image therein; and (b) a second irradiating of the resulting addressed spiropyran composition such that a three-dimensional image or images are selectively and effectively observable. In another embodiment, the imaging process comprises (a) writing comprising a first irradiation of selected core particles of the discrete phase of the matrix; and (b) reading comprising a second irradiation of the selected core particles of the first irradiation.

The first irradiating can take place for any desired or effective time interval, typically from about 1 microsecond to about 30 seconds, although the time interval for the first irradiating can be outside of this range. The first irradiating can take place at any desired or effective intensity, and at any desired or effective wavelength, typically from about 190 to about 425 nanometers, although the wavelength for the first irradiating can be outside of this range. The second irradiating typically takes place at from about a 20 to about a 30 fold reduced intensity compared to the first irradiating. The second irradiating can take place at any desired or effective wavelength, typically from about 190 to about 425 nanometers, although the wavelength for the second irradiating can be outside of this range. The first and second irradiating wavelengths can be the same as each other or different from each other.

The imaging process can further include subsequently focusing an irradiating laser beam in selected planes of the optically active material, thereby inducing photogenerated changes in the optical and photoactive properties of the medium as illustrated herein, wherein writing or recording of optical data with three-dimensional resolution is accomplished.

If desired, either a third irradiating or a heating can be carried out, wherein the spiropyran compound in the matrix is either irradiated at an effective wavelength or heated to accomplish the reverse photochromic effect and convert any spiropyran that had previously been shifted to the merocyanine form by the first irradiating back to its original spiropyran form. Typical wavelengths for this irradiation are from about 425 to about 700 nanometers, although the wavelength can be outside this range.

The medium of the present invention can be prepared by simple manufacturing processes employing previously prepared and well defined engineered subunit particles, such as polymeric latex or colloidal particles with an encapsulating shell thereover. The working three-dimensional structure can be prepared readily by simple heating, so that the three-dimensional ordering of the structure does not have to be exact to provide reliable writing and reading capability.

Monodisperse core-shell latices or dispersions can be prepared by any desired or effective process, such as those disclosed in, for example, *J. Appl. Pol. Sci.*, 1995, 58, 2047, and *J. Pol. Sci., Part A: Pol. Chem.*, 1995, 33,1597, the disclosures of each of which are totally incorporated herein by reference; the methods disclosed in these publications typically provide particles with high dispersion stability, narrow particle size distributions, and freedom from secondary particles or seed generations.

The core resin or the shell resin or both can contain a spiropyran compound and a chelating agent according to the present invention. The spiropyran compound can be in physical admixture with the core resin or the shell resin, covalently bound to the core resin or the shell resin, or both. In a specific embodiment, when both the core resin and the shell resin contain one or more spiropyran compounds according to the present invention, the spiropyran compounds chosen for the respective resin components are different, for example, in identity and/or in amount.

Embodiments of the present invention include three-dimensional structures which can be used for optical memory devices and optical recording processes wherein, for example, each core particle containing a spiropyran compound and chelating agent according to the present invention can effectuate a single bit or pixel of recorded information. By varying the size of the core resin particles and using different spiropyran compounds, it is possible effectively to match a range of wavelengths to the core resin and spiropyran compound used for recording. In addition, when two or more different spiropyrans are present, either both in the core, both in the shell, or one in the core and one in the shell, multiple addressing at one site is possible.

FIG. 1 illustrates a schematic of an exemplary preparative sequence for the preparation of a three-dimensional high density storage medium of the present invention. First, core-shell latex particles 1 are provided with a spiropyran compound physically admixed within and/or covalently bound to latex core particles 2 and with a chelating agent physically admixed within latex core particles 2, while the shell 3 resins are substantially optically insensitive in the same region of the electromagnetic spectrum, and the shell resins are preferably optically inert. The core-shell latex particles can be prepared by conventional core-shell or encapsulation methodologies, or as illustrated herein. Second, the latex particles 1 are organized by concentrating 10 the latex particles, by known techniques, such as sedimentation followed or accompanied by evaporation, into a three-dimensional compact 20 wherein the latex particles are closely packed and the shells of adjacent particles are in intimate contact. For example, water evaporation causes an increase in the concentration of latex particles in the system. Thereafter, the three-dimensional compact 20 is further condensed or compacted into a monolithic polymer "block" 30 by, for example, heating 40 for a sufficient time and sufficient temperature to effect partial or flash melting of shell resin polymers so that the core particles 32 remain substantially separated or suspended and spaced apart from adjacent core particles by the fused and resolidified shell resin which now forms the continuous resin matrix 33. Heating by, for example, thermal or nonconflicting radiative means, accomplishes annealing of the latex shell resin coating, which has a glass transition temperature significantly lower than the cores and results in the formation of the transparent optically inert matrix 33, wherein the size, shape, and surface morphology of the core particles 32 contained within the inert matrix are substantially unchanged from the core particles in the initial latex suspension.

The structure of the optically sensitive three-dimensional material can be characterized by, for example, Laser Confocal Fluorescent Microscopy (LCFM).

The dimensions of cores and shells generally determine the average distance between the planes of particles in the z-direction, i.e., the distance between the planes of optical recording. For example, when the core and the shell diameters are about 640 and 1040 nanometers, respectively, the interplane separation is about 0.9 micron, and when the core and the shell diameters are about 360 and 530 nanometers, respectively, the separation is about 0.5 micron.

It will be readily appreciated by one of ordinary skill in the art that a mixture or mixtures of monodisperse latices can be selected if desired, for example, to introduce nonuniformity to the three-dimensional structure, or to create periodic variation in the tertiary lattice structure for the purpose of further refining and elaborating upon the writing and recording processes illustrated herein.

The core resin or the shell resin or both of the present invention contain a spiropyran material of the formula

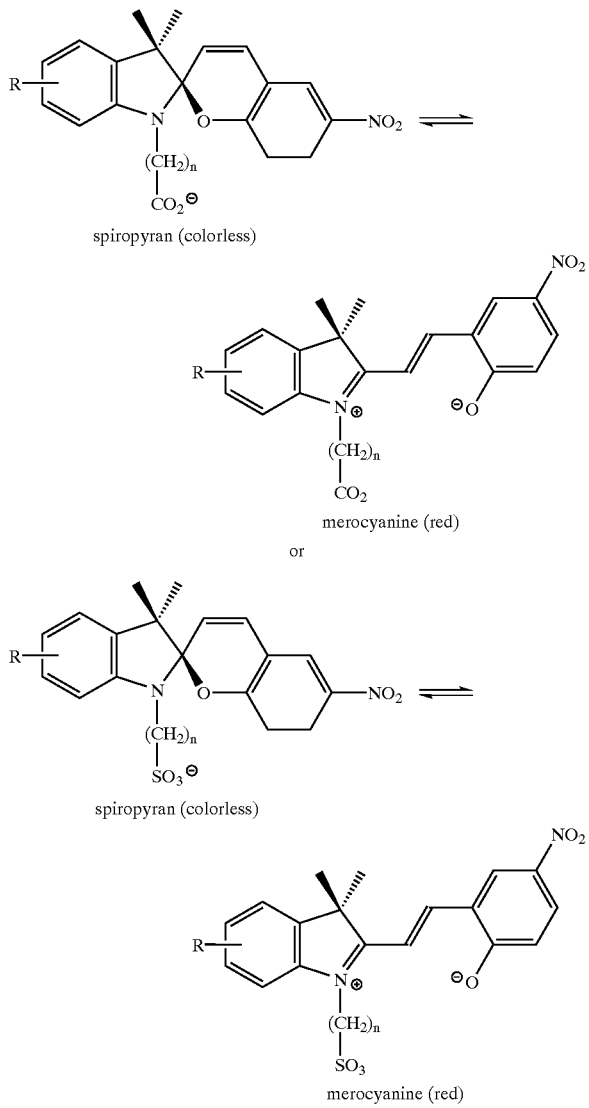

spiropyran (colorless)

merocyanine (red)

or spiropyran (colorless)

merocyanine (red)

wherein n is an integer representing the number of repeat —$CH_2$— units, typically being from about 2 to about 8, although the value of n can be outside of this range, and R is —H or —CH=$CH_2$. The anionic —COO$^-$ and —SO$_3^-$ groups are, of course, accompanied by cations. Any desired or suitable cations can be employed. Materials of the formula

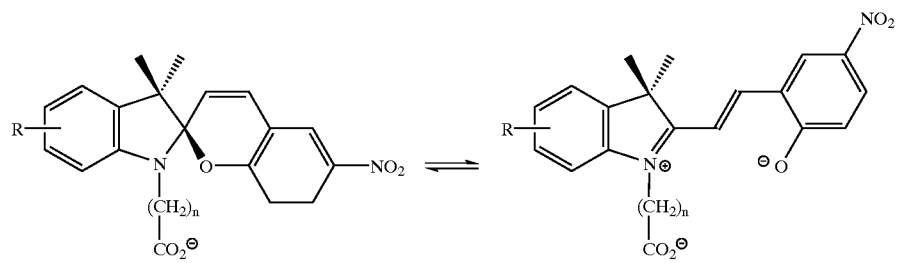

can be prepared by the reaction of 2,3,3-trimethylindolenine with β-iodopropionic acid, followed by condensation with 5-nitrosalicaldehyde in the presence of triethylamine. Materials of the formula

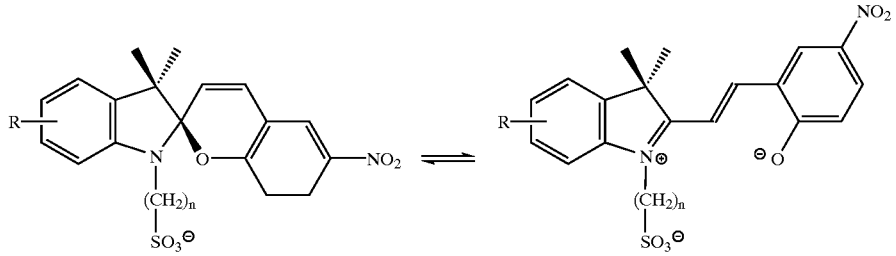

can be prepared by the reaction of 2,3,3-trimethylindolenine with γ-sulfone, followed by condensation with 5-nitrosalicaldehyde in the presence of triethylamine. When the spiropyran is dispersed within or covalently bound to the core and/or shell resin, the spiropyran is present in the core and/or shell resin in any desired or effective amount, typically at least about 0.01 percent by weight of the core and/or shell resin, preferably at least about 0.05 percent by weight of the core and/or shell resin, and more preferably at least about 0.5 percent by weight of the core and/or shell resin, and typically no more than about 5 percent by weight of the core and/or shell resin, although the amount can be outside of these ranges. Expressed in different units, the spiropyran is present in the core and/or shell resin typically at least about 0.015 molar percent of the core and/or shell resin, and preferably at least about 0.05 molar percent of the core and/or shell resin, and typically no more than about 2 molar percent of the core and/or shell resin, and preferably no more than about 0.2 molar percent of the core and/or shell resin (with molar percentages being based on the total weight of the core and/or shell resin), although the amount can be outside of these ranges.

The portions of the medium of the present invention containing the spiropyran (i.e., the core resin, the shell resin, or both) also contain a chelating agent with which the merocyanine form of the spiropyran can chelate to stabilize this form of the molecule. The chelating agent is admixed with the spiropyran compound in the core and/or shell resin. Examples of suitable chelating agents include metal salts in the +2 state, such as $Ca^{2+}$, $Zn^{2+}$, $Mg^{2+}$, transition metals, and the like, wherein the accompanying anion or anions are such that the metal salt is water soluble, such as nitrate, chloride, bromide, and the like. The chelating agent is present in any desired or effective amount, typically in a molar ratio to the spiropyran of at least about 1 mole of chelating agent for every 1 mole of spiropyran, preferably at least about 2 moles of chelating agent for every 1 mole of spiropyran, more preferably at least about 3 moles of chelating agent for every 1 mole of spiropyran, and even more preferably at least about 5 moles of chelating agent for every 1 mole of spiropyran, and typically no more than about 10 moles of chelating agent for every 1 mole of spiropyran, although there is no upper limit on the amount of chelating agent that can be present, and although the amount of chelating agent can be outside of these ranges.

In one specific embodiment, the spiropyran is incorporated into the backbone of the core resin and/or the shell resin. In this embodiment, the spiropyran is first substituted with a vinyl group via Friedel-Crafts alkylation, and the spiropyran can then be included as a comonomer in the polymerization process to form the core or shell resin. If desired, it is also possible to react the vinyl-substituted resin with the already-formed polymer.

The portions of the medium of the present invention having the spiropyran therein are photochromic in that they have a first state corresponding to a first absorption spectrum and a second state corresponding to a second absorption spectrum. The photochromic shift from the first state to the second state can be effected by any method suitable for the photochromic spiropyran material. Examples of methods for inducing the photochromic shift include irradiation with radiation of a suitable wavelength, typically from about 190 to about 425 nanometers, although the wavelength can be outside this range. The reverse photochromic effect can be induced by irradiation with visible light, typically in the wavelength range of from about 425 to about 700 nanometers, although the wavelength can be outside this range, or by the application of heat. By exposing the medium of the present invention to radiation of the appropriate wavelength, the portions of the medium having the spiropyran therein or thereon can be switched from one color to another, either in imagewise fashion by imagewise exposure to radiation or uniformly by uniform exposure to radiation. Another embodiment of the present invention is directed to a process which comprises (a) providing a medium according to the present invention; and (b) exposing said medium to radiation at a wavelength effective to cause the spiropyran material in at least a portion of the medium to shift to a merocyanine form. In a specific embodiment, subsequent to step (b), the medium is exposed either to heat at a temperature effective to cause at least some of the medium containing the material in the merocyanine form to shift back to the spiropyran or to radiation at a wavelength effective to cause at least some of the medium containing the material in the merocyanine form to shift back to the spiropyran.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

Preparation of Carboxylate and Sulfonate Substituted Spiropyran Salts

Step 1: Synthesis of 2,3,3-trimethylindolinium Salts

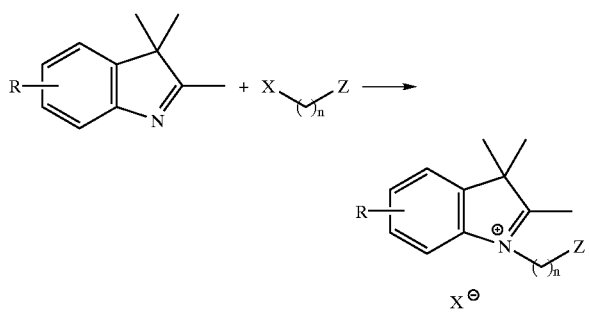

Because of the relatively weak nucleophilicity of 2,3,3-trimethylindolenine (where R is hydrogen) or its vinyl derivative 2,3,3,8-vinyl tryimethylindolenine (where R is vinyl), the syntheses of 2,3,3-trimethylindolinium salts were conducted either in the absence of any solvent or with a dipolar aprotic solvent (nitromethane) at 100° C.

Vinyl containing indolenine precursors can be prepared by Friedel-Crafts acylation of the precursors for the preparation of polymerizable spiropyrans. Alternatively, Friedel-Crafts acylation of the spiropyrans can be carried out. A general synthetic route to these materials is disclosed in, for example, G. K. Hamer, I. R. Peat, and W. F. Reynolds, "Investigations of Substituent Effects by Nuclear Magnetic Resonance Spectroscopy and All-Valence Electron Molecular Orbital Calculations. I. 4-Substituted Styrenes," Can. J. Chem., Vol. 51,. 897–914 (1973) and G. K. Hamer, I. R. Peat, and W. F. Reynolds, "Investigations of Substituent Effects by Nuclear Magnetic Resonance Spectroscopy and All-Valence Electron Molecular Orbital Calculations. II. 4-Substituted α-Methylstyrenes and α-t-Butylstyrenes," Can. J. Chem., Vol. 51, 915–926 (1973), the disclosures of each of which are totally incorporated herein by reference, and is outlined below.

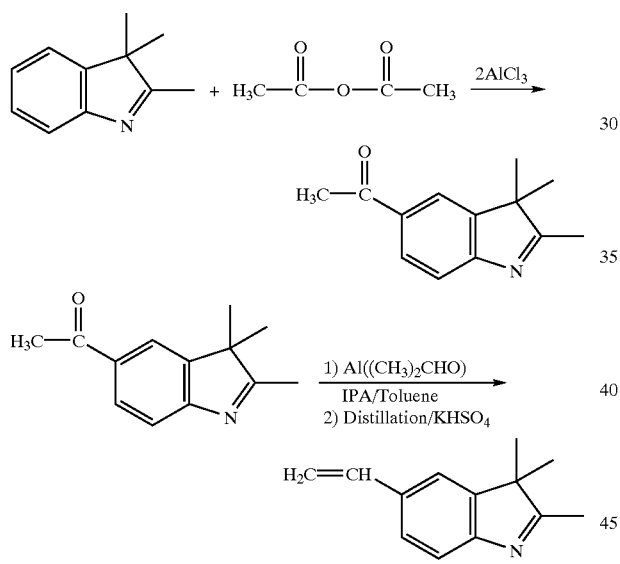

Alkylating agents that can be used in this reaction (all available from Aldrich Chemical Co., Milwaukee, Wis.) are 3-iodopropionic acid, ethyl 5-bromopentanoate, 6-bromohexanoic acid, 1,3-propylsulfone, and 1,4-butylsulfone. The choice of these reagents ensures that competing ring-formation and/or acid-base reactions are minimal to allow for nucleophilic attack of the sp2-N.

IA

Synthesis of N-(2-carboxyethyl)-2,3,3-trimethylindolinium Iodide

The general procedure for the preparation of the 2,3,3-trimethylindolinium salt intermediates is illustrated through the reaction of 2-iodopropionic acid and 2,3,3-trimethylindolenine. Vinyl containing intermediates can also be prepared from the N-(2-carboxyethyl)-2,3,3-trimethylindolinium iodide.

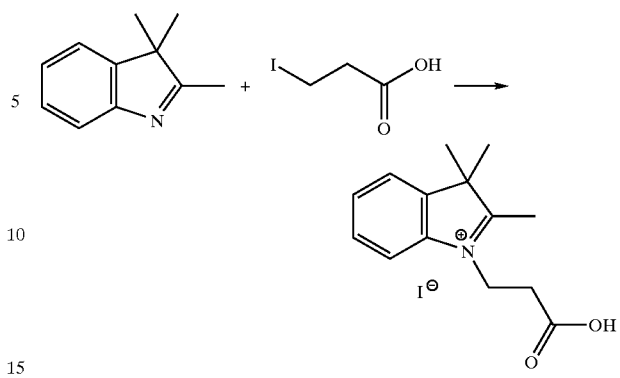

A 2-necked 50 milliliter round-bottomed flask equipped with a magnetic stirring bar and an argon inlet was charged with re-distilled (pressure 2 mm Hg, temperature 45° C.) 2,3,3-trimethylindolenine (7.95 grams, 50.0 mmol) and 3-iodopropionic acid (2.00 grams, 10 mmol). The mixture was heated to 80° C. for 12 hours, during which time the product precipitated out of solution and formed a highly viscous medium. Upon cooling, the reaction mixture was extracted three times with 200 milliliter portions of diethyl ether to remove all of the unreacted starting material. The remaining crystalline solid was then dissolved in 10 milliliters of water, extracted three times with 50 milliliter portions of diethyl ether, and extracted three times with 25 milliliter portions of $CHCl_3$. The aqueous layer was then removed and dried under vacuum (1.0 mm Hg) for 24 hours. The resulting amorphous solid was then recrystallized from toluene/$CHCl_3$ mixtures to produce the N-(2-carboxyethyl)-2,3,3-trimethylindolinium iodide product as 3.0 grams of a yellow solid (83.5 percent yield). $^1H$ and $^{13}C$ NMR spectra indicated the following:

$^1H$ NMR (400.1 MHz) in DMSO-$d_6$: δ 7.97 (1H, m), 7.83 (1H, m), 7.59 (2H, m), 4.64 (2H, t, J=6, N—$CH_2$), 2.97 (2H, t, J=6, $CH_2CO$), 2.86 (3H, s, $CH_3$), 1.52 (6H, s, $CH_3$).

$^{13}C$ NMR (100.1 MHz) in DMSO-$d_6$: 198.0, 171.6, 141.8, 140.7, 129.5, 129.1, 123.7, 115.7, 54.4, 43.9, 31.3, 22.1, 15.0.

IB

Synthesis of N-(ethylpentanoyl)-2,3,3-trimethylindolinium Bromide

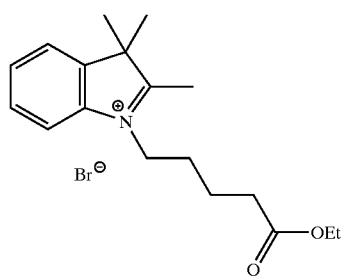

N-(ethylpentanoyl)-2,3,3-trimethylindolinium bromide was prepared by the process set forth in Example IA with 2,3,3-trimethylindolenine and ethyl 5-bromopentanoate to produce 2.65 grams (78 percent yield) of reddish-yellow crystals. $^1H$ and $^{13}C$ NMR spectra indicated the following:

$^1H$ NMR (400.1 MHz) in DMSO-$d_6$: δ 8.02 (1H, m), 7.83 (1H, m), 7.61 (2H, m), 4.48 (2H, t, J=6, N—$CH_2$), 4.01 (2H, t, J=7, O—CH$_2$), 2.84 (3H, s, CH$_3$), 2.40 (2H, t, J=7, CH$_2$CO), 2.08 (4H, m, —CH$_2$), 1.53 (6H, s, CH$_3$), 1.13 (3H, t, J=7 Hz).

$^{13}$C NMR (100.1 MHz) in DMSO-d$_6$: 197.0, 173.8, 172.3, 141.9, 141.2, 129.4, 128.9, 123.6, 115.3, 60.2, 54.3, 46.9, 30.3, 22.4, 22.0, 14.1.

IC

Synthesis of N-(5-carboxypentyl)-2,3,3-trimethylindolinium Bromide

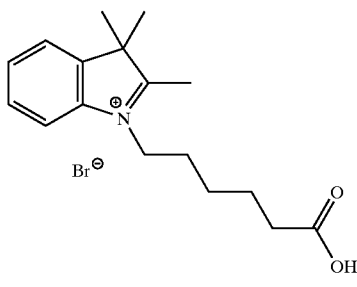

N-(5-carboxypentyl)-2,3,3-trimethylindolinium bromide was prepared by the process set forth in Example IA with 2,3,3-trimethylindolenine and 6-bromohexanoic acid to produce 2.43 grams (71.2 percent yield) of yellow crystals. $^1$H and $^{13}$C NMR spectra indicated the following:

$^1$H NMR (400.1 MHz) in DMSO-d$_6$: δ 7.98 (1H, m), 7.86 (1H, m), 7.60 (2H, m), 4.46 (2H, t, J=6, N—CH$_2$), 2.85 (3H, s, CH$_3$), 2.21 (2H, t, J=7, CH$_2$CO), 1.83 (2H, m, —CH$_2$), 1.52 (6H, s, CH$_3$), 1.46 (4H, s, —CH$_2$—).

$^{13}$C NMR (100.1 MHz) in DMSO-d$_6$: 196.9, 174.7, 142.3, 141.5, 129.6, 129.4, 123.9, 115.9, 54.6, 47.9, 33.8, 27.4, 25.8, 24.5, 22.4, 14.6.

ID

Synthesis of 2,3,3-trimethylindolinium-N-propylsulfonate

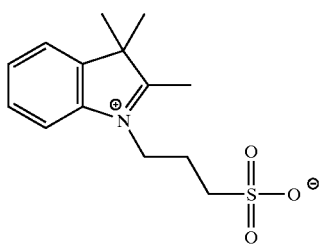

2,3,3-trimethylindolinium-N-propylsulfonate was prepared by the process set forth in Example IA with 2,3,3-trimethylindolenine and 1,3-propylsultone to produce 2.98 grams (94 percent yield) of white crystals. $^1$H and $^{13}$C NMR spectra indicated the following:

$^1$H NMR (400.1 MHz) in DMSO-d$_6$: δ 7.99 (1H, m), 7.77 (1H, m), 7.55 (2H, m), 4.60 (2H, t, J=7, N—CH$_2$), 2.78 (3H, s, CH$_3$), 2.61 (2H, t, J=7, CH$_2$SO$_3$-), 2.11 (2H, m, —CH$_2$—), 1.47 (6H, s, CH$_3$).

$^{13}$C NMR (100.1 MHz) in DMSO-d$_6$: 196.9, 142.2, 141.5, 129.6, 129.2, 123.7, 115.7, 54.4, 47.7, 46.9, 24.0, 22.3, 14.1.

IE

Synthesis of 2,3,3-trimethylindolinium-N-butylsulfonate

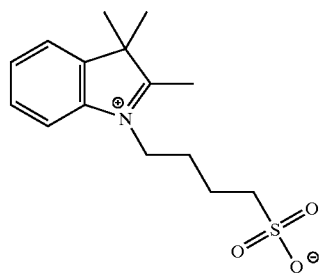

2,3,3-trimethylindolinium-N-butylsulfonate was prepared by the process set forth in Example IA with 2,3,3-trimethylindolenine and 1,4-butylsulfone to produce 2.86 grams (89.2 percent yield) of white crystals. $^1$H and $^{13}$C NMR spectra indicated the following:

$^1$H NMR (400.1 MHz) in DMSO-d$_6$: δ 8.03 (1H, m), 7.82 (1H, m), 7.60 (2H, m), 4.48 (2H, t, J=7, N—CH$_2$), 2.85 (3H, s, CH$_3$), 2.49 (2H, m, CH$_2$SO$_3$-), 1.97 (2H, m, —CH$_2$—), 1.76 (2H, m, —CH$_2$—) 1.53 (6H, s, CH$_3$).

$^{13}$C NMR (100.1 MHz) in DMSO-d$_6$: 196.9, 142.2, 141.5, 129.6, 129.2, 123.7, 115.7, 54.4, 47.7, 46.9, 24.0, 22.8, 22.3, 14.1.

EXAMPLE II

Preparation of Carboxylate Substituted Spiropyran Salts

Step 2: Synthesis of 6-nitro-benzoindolino Spiropyrans (BIPS)

In the presence of a base, the functionalized salts were converted to an activated Fischer Base capable of undergoing a condensation reaction with 5-nitrosalicaldehyde. The solvent used in this reaction was ethanol, since the majority of spiropyrans are only partially soluble in this medium.

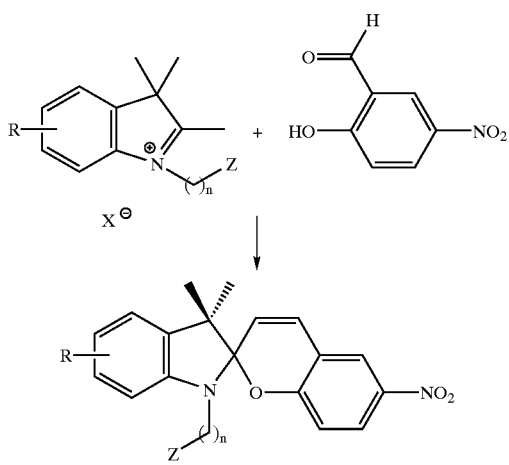

IIA

Synthesis of 6-Nitro-N-(2-carboxyethyl) spirobenzoindolinopyran

The general procedure for the preparation of the spiropyrans is illustrated through the condensation of 2-carboxyethyl-2,3,3-trimethylindolinium iodide with 5-nitrosalicaldehyde in the presence of a base, triethylamine.

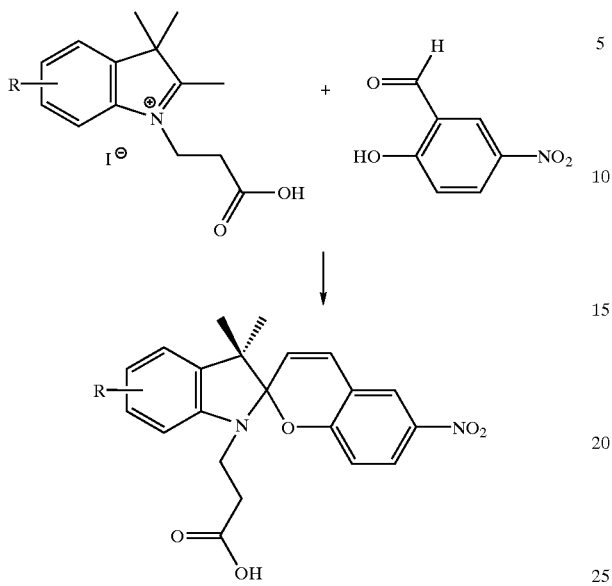

Into a 50 milliliter round-bottomed flask equipped with a water condenser topped with a pressure-equalized dropping funnel was added 2-carboxyethyl-2,3,3-trimethylindolinium iodide (prepared as described in Example IA; 1.0 gram, 2.78 mmol) and 5-nitrosalicaldehyde (0.50 gram, 3.0 mmol). Ethanol was added until the solids dissolved at reflux temperature, followed by addition of triethylamine (0.280 gram, 2.78 mmol) in 5 milliliters of ethanol via the dropping funnel over 20 minutes. Addition of the base resulted in an immediate color change to purple, signifying that spiropyran formation was occurring. The mixture was refluxed for 6 hours and then cooled to room temperature. The volume was concentrated to 5 milliliters before cooling the flask to 0° C. in a refrigerator for 24 hours. The spiropyran precipitate was filtered under vacuum and recrystallized from ethanol to give yellow crystals of 6-nitro-N-(2-carboxyethyl) spirobenzoindolinopyran, yield 0.763 grams (72.2 percent), melting point 192–194° C. $^1$H NMR, $^{13}$C NMR, IR, and UV-visible spectra indicated the following:

$^1$H NMR (400.1 MHz) in DMSO-$d_6$: δ 8.21 (1H, d, J=3), 8.00 (1H, d, J=9), 7.21 (1H, d, J=10.5), 7.11 (2H, m), 6.87 (2H, m), 6.67 (1H, d, J=7.8), 6.00 (1H, d, J=10.5), 3.42 (2H, J=6, N—CH$_2$), 2.50 (2H, t, J=6, CH$_2$CO), 1.18 (3H, s, CH$_3$), 1.07 (3H, s, CH$_3$).

$^{13}$C NMR (100.1 MHz) in DMSO-$d_6$: 173.7, 159.9, 146.9, 141.3, 136.5, 129.0, 128.5, 126.5, 123.6, 122.6, 120.1, 119.7, 116.3, 107.5, 107.3, 53.5, 34.0, 26.4, 20.3.

IR (KBr, cm$^{-1}$): 3030, 3000, 2971, 1709, 1654, 1610, 1575, 1510, 1483, 1457, 1441, 1360, 1330, 1270, 1141, 1088, 1020, 915, 803.

UV-Visible (DMSO, $\lambda_{max}(\epsilon)$): 336 nm, 9,600 M$^{-1}$cm$^{-1}$.

Elemental analysis: Calculated for $C_{21}H_{20}O_5N_2$: C, 65.30; H, 5.26; N, 7.30. Found: C, 64.96; H, 5.23; N, 7.22.

IIB

Synthesis of 6-Nitro-(N-ethylpentanoyl) spirobenzoindolinopyran

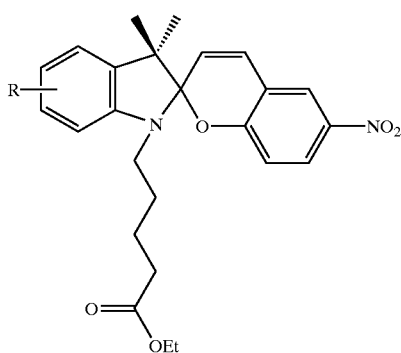

6-Nitro-(N-ethylpentanoyl)spirobenzoindolinopyran was prepared by the process set forth in Example IIA with 5-nitrosalicaldehyde and N-(ethylpentanoyl)-2,3,3-trimethylindolinium bromide (prepared as described in Example IB). $^1$H NMR spectra indicated the following:

$^1$H NMR (400.1 MHz) in CDCl$_3$: δ 7.99 (2H, m), 7.15 (1H, t), 7.06 (1H, d), 6.86 (2H, t), 6.72 (1H, d), 6.60 (1H, t), 5.85 (1H, d), 4.08.(2H, q, O—CH$_2$), 3.17 (2H, t), 2.39 (2H, CH$_2$CO), 2.00 (4H, m, —CH$_2$), 1.22 (9H, m, CH$_3$).

Deprotection of the Chelating Functionality

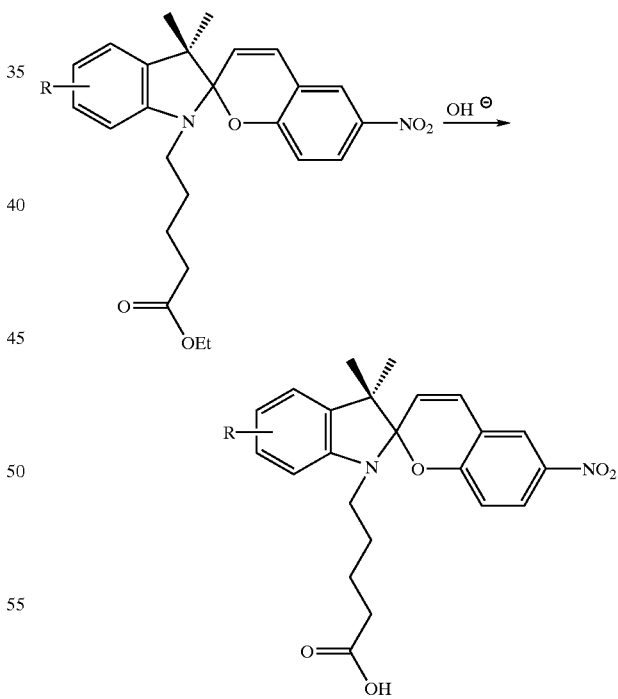

To a 50 milliliter round-bottomed flask equipped with a magnetic stir bar and an argon inlet was added finely ground 6-nitro-(N-ethylpentanoate)spirobenzoindolinopyran (1.0 gram, 2.28 mmol) and dissolved in 10 milliliters of THF. Sodium hydroxide (25 milliliters of a 1 Molar solution) was added to the solution and stirred for 24 hours before rotary evaporation at room temperature under high vacuum. The solids were dissolved in a minimum amount of water and the product was precipitated through neutralization with 1 Molar hydrochloric acid. Vacuum filtration isolated the solid, which was recrystallized from ethanol to yield 0.962 gram of yellow-red crystals of 6-nitro-(N-4-carboxylbutyl) spirobenzoindolinopyran (94 percent yield), melting point 139–141° C. $^1$H NMR, $^{13}$C NMR, IR, and UV-visible spectra indicated the following:

$^1$H NMR (400.1 MHz) in DMSO-$d_6$: δ 8.19 (1H, d, J=2.8), 7.97 (1H, d, J=9.0), 7.19 (1H, d, J=10.4), 7.08 (2H, m), 6.84 (1H, d, J=7.2), 6.76 (1H, t, J=7.2), 6.57 (1H, d, J=7.8), 5.98 (1H, d, J=10.4), 3.10 (2H, m, N—CH$_2$), 2.16 (2H, t, J=6.8, CH$_2$CO), 1.55 (4H, m, —CH$_2$—), 1.18 (3H, s, CH$_3$), 1.09 (3H, s, CH$_3$).

$^{13}$C NMR: 174.4, 159.2, 146.7, 140.4, 135.6, 128.1, 127.6, 125.7, 122.8, 121.6, 118.9, 118.7, 115.4, 106.4, 52.2, 33.5, 28.0, 26.1, 24.2, 19.5.

IR (cm$^{-1}$): 3030, 3000, 2971, 1709, 1654, 1610, 1575, 1510, 1483, 1457, 1441, 1360, 1330, 1270, 1141, 1088, 1020, 915, 803.

UV-Visible (DMSO, $\lambda_{max}(\epsilon)$): 338 nm, 7,800 M$^{-1}$cm$^{-1}$.

Elemental analysis: Calculated for C$_{23}$H$_{24}$O$_5$N$_2$: C, 67.61; H, 5.89; N, 6.82. Found: C, 67.31; H;. 5.92; N, 6.60.

IIC

Synthesis of 6-nitro-N-(5-carboxypentyl) spirobenzoindolinopyran

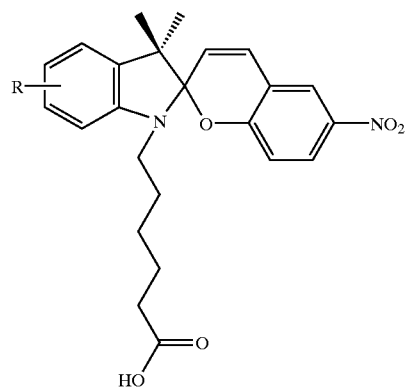

6-nitro-N-(5-carboxypentyl)spirobenzoindolinopyran was prepared by the process set forth in Example IIA with 5-nitrosalicaldehyde and N-(5-carboxypentyl)-2,3,3-trimethylindolinium bromide (prepared as described in Example IC) to produce 1.23 grams (48 percent yield) of yellow-red crystals, melting point 80–82° C. $^1$H NMR, $^{13}$C NMR, IR, and UV-visible spectra indicated the following:

$^1$H NMR (400.1 MHz) in DMSO-$d_6$: δ 8.19 (1H, d, J=3.2), 8.00 (1H, d, J=9.0), 7.21 (1H, d, J=10.5), 7.08 (2H, m), 6.80 (2H, m), 6.57 (1H, d, J=7.8), 5.98 (1H, d, J=10.5), 3.10 (2H, m, N—CH$_2$) 2.13 (2H, m, CH$_2$CO), 1.45 (4H, m, —CH$_2$—), 1.20 (2H, m, —CH$_2$—), 1.18 (3H, s, CH$_3$), 1.07 (3H, s, CH$_3$).

$^{13}$C NMR: 174.4, 159.2, 146.7, 140.4, 135.6, 128.1, 127.6, 125.7, 122.8, 121.6, 118.9, 118.7, 115.4, 106.4, 52.2, 33.5, 28.0, 26.1, 25.8, 24.2, 19.5.

IR (cm$^{-1}$): 3030, 3000, 2971, 1709, 1654, 1610, 1575, 1510, 1483, 1457, 1441, 1360, 1330, 1270, 1141, 1088, 1020, 915, 803.

UV-Visible (DMSO, $\lambda_{max}(\epsilon)$): 342 nm, 8,400 M$^{-1}$cm$^{-1}$.

Elemental analysis: Calculated for C$_{24}$H$_{25}$O$_5$N$_2$: C, 68.20; H, 6.16; N, 6.70. Found: C, 68.30; H, 6.09; N, 6.52.

Step 3: Preparation of Carboxylate Salts

Preparation of the carboxylate salts entailed the treatment of an alcoholic solution of the spiropyran with about 1 molar equivalent of NaOEt or KOEt. A representative procedure is described through the reaction of 6-nitro-(N-carboxyethyl) spirobenzoindolinopyran with NaOEt:

IID

Synthesis of 6-Nitro-spirobenzoindolinopyran-N-ethylsodiumcarboxylate

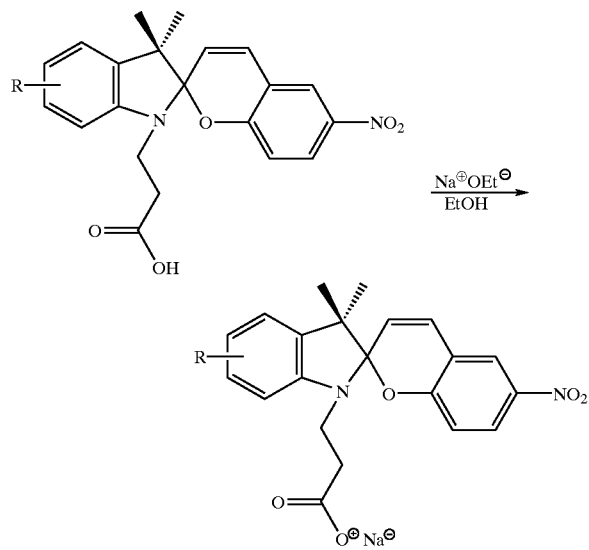

In a 50 milliliter round-bottomed flask equipped with a magnetic stir bar and an argon inlet was added finely ground 6-nitro-(N-carboxyethyl)spirobenzoindolinopyran (0.100 gram, 0.263 mmol) prepared as described in Example IIA and dissolved in 5 milliliters of ethanol. The mixture was then cooled to 0° C. in an ice bath before adding through a syringe 3.0 milliliters of an 8.64×10$^{-2}$ Molar NaOEt (0.265 mmol) solution. The reaction was stirred for 3 hours before rotary evaporation at room temperature under high vacuum. Recrystallization from ethanol gave 100 milligrams of yellow-red crystals of 6-nitro-spirobenzoindolinopyran-N-ethylsodiumcarboxylate (94.6 percent yield), melting point 202–204° C. $^1$H NMR, $^{13}$C NMR, IR, and UV-visible spectra indicated the following:

$^1$H NMR (400.1 MHz) in DMSO-$d_6$: δ 8.17 (1H, d, J=2.8), 7.96 (1H, d, J=9.0), 7.15 (1H, d, J=10.5), 7.07 (2H, m), 6.83 (1H, d, J=9), 6.73 (1H, t, J=7.3), 6.58 (1H, d, J=8.0), 5.98 (1H, d, J=10.5), 3.23 (2H, m, N—CH$_2$), 2.19 (2H, m, CH$_2$CO), 1.16 (3H, s, CH$_3$), 1.05 (3H, s, CH$_3$).

$^{13}$C NMR: 173.3, 159.2, 146.5, 140.3, 135.5, 127.7, 127.5, 125.5, 122.6, 122.0, 121.4, 118.8, 118.6, 115.3, 106.5, 106.4, 52.2, 36.2, 25.7, 19.5.

IR (cm$^{-1}$): 3020, 2970, 2923, 1652, 1607, 1588, 1507, 1480, 1450, 1330, 1275, 1218, 1156, 1123, 1090, 1020, 910, 803.

UV-Visible (DMSO, $\lambda_{max}(\epsilon)$): 338 nm, 8,400 M$^{-1}$cm$^{-1}$.

Elemental analysis (High resolution mass spectrometer (HRMS), fast atom bombardment with positive ions (FAB+)): Calculated for C$_{21}$H$_{21}$O$_5$N$_2$: 381.1451. Found: 381.1399.

IIE

Synthesis of 6-Nitrospirobenzoindolinopyran-N-butylpotassiumcarboxylate

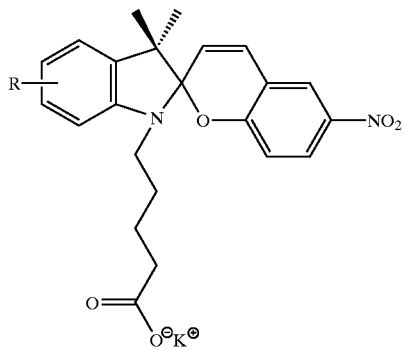

6-Nitrospirobenzoindolinopyran-N-butylpotassium carboxylate was prepared by the process set forth in Example IID with 6-nitro-(N-ethylpentanoyl)spirobenzoindolinopyran (prepared as described in Example IIB) to produce 0.94 gram of red crystals (94 percent yield), melting point 180–182° C. $^1$H NMR, $^{13}$C NMR, IR, and UV-visible spectra indicated the following:

$^1$H NMR (400.1 MHz) in DMSO-d$_6$: δ 8.18 (1H, d, J=2.6), 7.97 (1H, d, J=9.0), 7.18 (1H, d, J=10.5), 7.10 (2H, m), 6.85 (1H, d, J=9), 6.74 (1H, t, J=7.3), 6.57 (1H, d, J=7.8), 5.98 (1H, d, J=10.5), 3.49 (1H, m, N—CH), 3.05 (1H, m, N—CH), 1.81 (2H, m, CH$_2$CO), 1.32 (2H, m, —CH$_2$—), 1.20 (2H, m, —CH$_2$—), 1.1 (3H, s, CH$_3$), 1.07 (3H, s, CH$_3$).

$^{13}$C NMR: 174.4, 159.2, 146.7, 140.4, 135.6, 128.1, 127.6, 125.7, 122.8, 121.6, 118.9, 118.7, 115.4, 106.6, 106.4, 52.2, 42.7, 28.0, 26.1, 25.8, 19.5.

IR (cm$^{-1}$): 3020, 2970, 2923, 1652, 1607, 1588, 1507, 1480, 1450, 1330, 1275, 1218, 1156, 1123, 1090, 1020, 910, 803.

UV-Visible (DMSO, $\lambda_{max}$(ε)): 342 nm, 8,400 M$^{-1}$cm$^{-1}$.

Elemental analysis (HRMS (FAB+)): Calculated for C$_{23}$H$_{24}$O$_5$N$_2$K: 447.2677 Found: 447.2688.

IIF

Synthesis of 6-Nitrospirobenzoindolinopyran-N-pentylpotassium Carboxylate

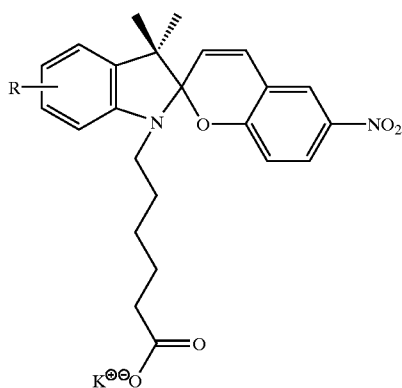

6-Nitrospirobenzoindolinopyran-N-pentylpotassium carboxylate was prepared by the process set forth in Example IID with 6-nitro-N-(5-carboxypentyl)spirobenzoindolinopyran (prepared as described in Example IIC) to produce 0.54 grams (73 percent yield) of dark red 6-nitrospirobenzoindolinopyran-N-pentylpotassium carboxylate crystals, melting point 100–102° C. $^1$H NMR, 13C NMR, IR, and UV-visible spectra indicated the following:

$^1$H NMR (400.1 MHz) in DMSO-d$_6$: δ 8.17 (1H, d, J=2.8), 7.97 (1H, d, J=9.0), 7.18 (1H, d, J=10.5), 6.84 (2H, m), 6.84 (1H, d, J=9), 6.77 (1H, t, J=7.6), 6.55 (1H, d, J=7.8), 5.98 (1H, d, J=10.5), 3.10 (2H, m, N—CH$_2$), 1.79 (2H, m, CH$_2$CO), 1.45 (4H, m, —CH$_2$—), 1.20 (2H, m, —CH$_2$—), 1.18 (3H, s, CH$_3$), 1.05 (3H, s, CH$_3$).

13C NMR: 174.4, 159.2, 146.7, 140.4, 135.6, 128.1, 127.6, 125.7, 125.2, 122.8, 121.8, 118.8, 118.7, 115.4, 106.4, 52.2, 43.0, 33.5, 28.0, 26.1, 25.8, 24.2, 19.5, 14.1.

IR (cm$^{-1}$): 3020, 2970, 2923, 1652, 1607, 1588, 1507, 1480, 1450, 1330, 1275, 1218, 1156, 1123, 1090, 1020, 910, 803.

UV-Visible (DMSO, $\lambda_{max}$(ε)): 342 nm, 8,400 M$^{-1}$cm$^{-1}$.

Elemental analysis (HRMS (FAB+)): Calculated for C$_{24}$H$_{25}$O$_5$N$_2$K: 461.2424. Found: 461.2445.

EXAMPLE III

Preparation of Sulfonate Substituted Spiropyran Salts

Step 2: Synthesis of 6-nitro-benzoindolino Spiropyrans (BIPS)

IIIA

Synthesis of 6-Nitro-spirobenzoindolinopyran-N-propyl-triethylammoniumsulfonate

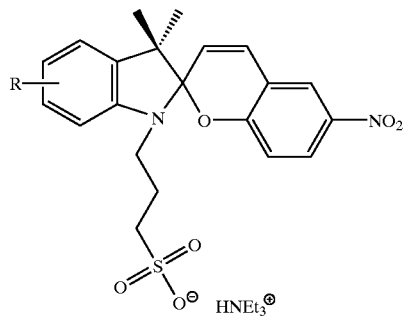

6-Nitro-spirobenzoindolinopyran-N-propyl-triethyl ammoniumsulfonate was prepared by the process set forth in Example IIA with 5-nitrosalicaldehyde and 2,3,3-trimethylindolinium-N-propylsulfonate prepared as described in Example ID). The product was re crystallized from ethyl acetate to produce 1.43 grams (52 percent yield) of yellow crystals, melting point 188–190° C. $^1$H NMR, $^{13}$C NMR, IR, and UV-visible spectra indicated the following:

$^1$H NMR (400.1 MHz) in DMSO-d$_6$: δ 8.27 (1H, d, J=2.8), 8.04 (1H, d, J=9.0), 7.26 (1H, d, J=10.4), 7.15 (2H, m), 6.83 (3H, m), 6.03 (1H, d, J=10.4), 3.29 (2H, t, J=7.3, N—CH$_2$), 3.13 (6H, q, J=7.3, CH$_2$CH$_3$), 2.50 (2H, m, CH$_2$SO$_3$) 1.49 (2H, m, —CH$_2$—), 1.25 (9H, t, CH$_3$), 1.19 (3H, s, CH$_3$), 1.16 (3H, s, CH$_3$).

$^{13}$C NMR: 159.2, 146.7, 140.4, 135.5, 128.1, 127.6, 125.7, 122.8, 121.6, 121.5, 118.9, 118.7, 115.4, 106.4, 106.4, 52.2, 49.0, 45.7, 42.2, 24.7, 19.5, 8.55.

IR (cm$^{-1}$): 3020, 2970, 2684, 2510, 1652, 1607, 1510, 1483, 1457, 1333, 1275, 1218, 1156, 1123, 1089, 1020, 916, 805.

UV-Visible (DMSO, $\lambda_{max}$(ε)): 342 nm, 8,600 M$^{-1}$cm$^{-1}$.

Elemental analysis: Calculated for C$_{27}$H$_{37}$O$_6$N$_3$S: C, 61.05; H, 6.70; N, 7.90; S, 5.94. Found: C, 61.30; H, 6.67; N, 7.83; S, 5.86.

IIIB
Synthesis of 6-Nitro-spirobenzoindolinopyran-N-butyl-triethylammoniumsulfonate

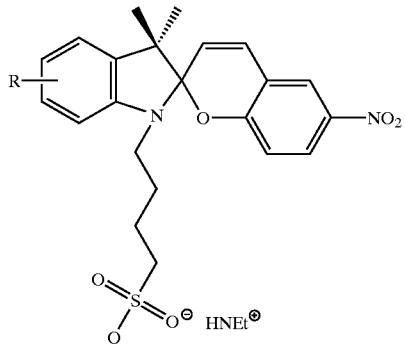

6-nitro-spirobenzoindolinopyran-N-butyl-triethylammonium sulfonate was prepared by the process set forth in Example IIA with 5-nitrosalicaldehyde and 2,3,3-trimethylindolinium-N-butylsulfonate (prepared as described in Example IE). The product was recrystallized from ethyl acetate to produce 0.86 gram (36 percent yield) of purple crystals, melting point 208–210° C. $^1$H NMR, $^{13}$C NMR, IR, and UV-visible spectra indicated the following:

$^1$H NMR (400.1 MHz) in DMSO-d$_6$: δ 8.27 (1H, d, J=2.8), 8.04 (1H, d, J=9.0), 7.26 (1H, d, J=10.4), 7.15 (2H, m), 6.83 (3H, m), 6.03 (1H, d, J=10.4), 3.29 (2H, t, J=7.3, N—CH$_2$), 3.13 (6H, q, J=7.3, CH$_2$CH$_3$), 2.50 (2H, m, CH$_2$SO$_3$) 1.49 (4H, m, —CH$_2$—), 1.25 (9H, t, CH$_3$), 1.19 (3H, s, CH$_3$), 1.16 (3H, s, CH$_3$).

$^{13}$C NMR: 159.2, 146.7, 140.4, 135.6, 128.1, 127.6, 125.7,122.8, 121.6, 118.9, 118.7, 115.4, 106.4, 59.7, 52.2, 42.5, 33.3, 28.0, 25.8, 24.2, 22.1, 19.5, 14.0.

IR (cm$^{-1}$): 3020, 2970, 2684, 2510, 1652, 1607, 1510, 1483, 1457, 1333, 1275, 1218, 1156, 1123, 1089, 1020, 916, 805.

UV-Visible (DMSO, $\lambda_{max}(\epsilon)$): 344 nm, 9,000 M$^{-1}$cm$^{-1}$.

Elemental analysis: Calculated for C$_{28}$H$_{39}$O$_6$N$_3$S: C, 59.70; H, 6.90; N, 7.52; S, 5.70. Found: C, 59.64; H, 6.84; N, 7.43; S, 5.62.

EXAMPLE IV
Latex Preparation with Spiropyran Covalently Bonded to Core Resin

Latices are prepared by a multistage emulsion polymerization using a semicontinuous scheme. All stages of latex particle formation are carried out at about 80° C. in a nitrogen atmosphere. Latex seeding is carried out by admixing 35 grams of water, 0.1 gram of potassium persulfate, and 1.5 grams of methylmethacrylate, followed by stirring for 1 hour. Thereafter, a mixture containing 13.5 grams of methylmethacrylate, 0.044 gram of dodecyl mercaptan, 0.534 gram of ethylene glycol dimethacrylate, 0.013 gram of calcium chloride (chelating agent), and 0.005 gram of a vinyl spiropyran of the formula

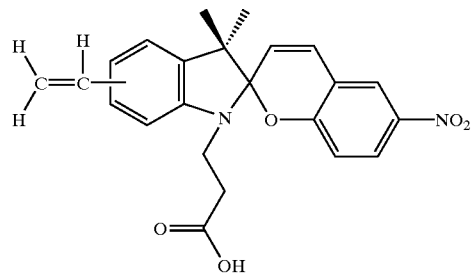

prepared by the method of Example IIA is fed to the reactor via fluid metering pump at a constant rate. Pumping time is typically from about 3 to about 4 hours. After the monomer addition is complete, the reaction is continued for about 1 hour. For second and further stages of emulsion polymerization, 20 grams, for example, of latex dispersion from previous stages is mixed with 40 grams of water and 0.005 gram of 2,2'azobis(2-methyl-proprionitrile) (AIBN). Thereafter a mixture containing 7 grams of methyl methacrylate, 0.052 gram of AIBN, 0.032 gram of dodecyl mercaptan, 0.276 gram of ethylene glycol dimethacrylate, 0.011 gram of calcium chloride (chelating agent), and 0.004 gram of the vinyl spiropyran is added to the reactor via fluid metering pump at a constant rate. Pumping time is typically from about 3 to about 4 hours. The preparation of the shell resin is performed by adding a mixture of 5 grams of methylmethacrylate monomer, 2.5 grams of butyl methacrylate, 0.034 gram of dodecyl mercaptan, and 0.049 gram of azobisisobutyronitrile as a nonionic initiator, to 10 grams of the core particle dispersion in about 20 grams of water over about 3 hours. The resulting latex is subsequently compacted, annealed, and characterized.

EXAMPLE V
Preparation of Three-Dimensional Optically Active Polymer Material

A latex in which the shell composition is a copolymer of methyl methacrylate and n-butyl methacrylate (copoly (BMA/MMA)) 33/67 by weight ratio and solid content 15 weight percent is placed in plastic containers and allowed to sediment and dry. The dry samples are annealed at 110° C. for about 12 hours.

Measurements of the glass transition temperature of the core and shell forming polymers can be carried out on a Perkin-Elmer DSC-7 differential scanning calorimeter at a scanning rate of 5 degrees per minute.

Dimensions of latex particles are measured by scanning electron microscopy (SEM, Hitachi S-570). A drop of a dilute latex dispersion is placed on an aluminum stub and allowed to dry. A gold coating is deposited on the surface of latex particles to prevent charging and distortion of the specimen by the electron beam.

The morphology of the polymer block material, that is the aforementioned annealed optically active material, can be examined on a Bio-Rad MRC 600 confocal fluorescent microscope (LCFM). SEM and LCFM images can be analyzed using Image Tools software, available from The University of Texas, Health Science Center.

EXAMPLE VI
Writing or Recording Information

For writing or recording information with the three-dimensional recording medium, the medium is exposed to radiation at a wavelength of from about 190 to about 425 nanometers in an imagewise pattern. That irradiation induces conversion of the irradiated spiropyran molecules to the merocyanine form, thereby converting them from a substantially colorless form to a red form. By subsequently focusing light in a particular plane in the z-direction recording is provided in three-dimensional space.

EXAMPLE VII
Reading Recorded Information

Readout is accomplished at about a 25 fold lower intensity of photoirradiation compared to that of the aforementioned writing procedure. Submicroscopic red marks are observed under microscopic examination and which marks correspond to the exposed areas on the sample.

EXAMPLE VIII

The process of Examples IV to VII is repeated except that the vinyl spiropyran 6-nitro-spirobenzoindolinopyran-N-ethylsodiumcarboxylate is replaced with the vinyl spiropyran 6-nitrospirobenzoindolinopyran-N-butylpotassium carboxylate prepared as described in Example IIE.

EXAMPLE IX

The process of Examples IV to VII is repeated except that the vinyl spiropyran 6-nitro-spirobenzoindolinopyran-N-ethylsodiumcarboxylate is replaced with the vinyl spiropyran 6-ntrospirobenzoindolinopyran-N-pentylpotassium carboxylate prepared as described in Example IIF.

EXAMPLE X

The process of Examples IV to VII is repeated except that the vinyl spiropyran 6-nitro-spirobenzoindolinopyran-N-ethylsodiumcarboxylate is replaced with the vinyl spiropyran 6-nitro-spirobenzoindolinopyran-N-propyl-triethyl ammoniumsulfonate prepared as described in Example IIIA.

EXAMPLE XI

The process of Examples IV to VII is repeated except that the vinyl spiropyran 6-nitro-spirobenzoindolinopyran-N-ethylsodiumcarboxylate is replaced with the vinyl spiropyran 6-nitro-spirobenzoindolinopyran-N-butyl-triethylammonium sulfonate prepared as described in Example IIIB.

EXAMPLE XII

The processes of Examples IV through XI are repeated except that the 0.013 gram of calcium chloride (chelating agent) and the 0.011 gram of calcium chloride (chelating agent) are replaced, respectively, with 0.017 gram of zinc chloride (chelating agent) and 0.013 gram of zinc chloride (chelating agent).

EXAMPLE XIII

Latex Preparation with Spiropyran Dispersed within Core Resin

Latices are prepared by a multistage emulsion polymerization using a semicontinuous scheme. All stages of latex particle formation are carried out at about 80° C. in a nitrogen atmosphere. Latex seeding is carried out by admixing 35 grams of water, 0.1 gram of potassium persulfate, and 1.5 grams of methylmethacrylate, followed by stirring for 1 hour. Thereafter, a mixture containing 13.5 grams of methylmethacrylate, 0.044 gram of dodecyl mercaptan, 0.534 gram of ethylene glycol dimethacrylate, 0.013 gram of calcium chloride (chelating agent), and 0.005 gram of a spiropyran of the formula

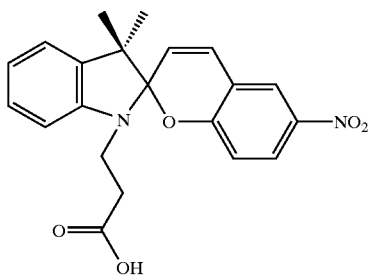

prepared by the method of Example IIA is fed to the reactor via fluid metering pump at a constant rate. Pumping time is typically from about 3 to about 4 hours. After the monomer/spiropyran addition is complete, the reaction is continued for about 1 hour. For second and further stages of emulsion polymerization, 20 grams, for example, of latex dispersion from previous stages is mixed with 40 grams of water and 0.005 gram of 2,2'azobis(2-methyl-proprionitrile) (AIBN). Thereafter a mixture containing 7 grams of methyl methacrylate, 0.052 gram of AIBN, 0.032 gram of dodecyl mercaptan, 0.276 gram of ethylene glycol dimethacrylate, 0.011 gram of calcium chloride (chelating agent), and 0.004 gram of the spiropyran is added to the reactor via fluid metering pump at a constant rate. Pumping time is typically from about 3 to about 4 hours. The preparation of the shell resin is performed by adding a mixture of 5 grams of methylmethacrylate monomer, 2.5 grams of butyl methacrylate, 0.034 gram of dodecyl mercaptan, and 0.049 gram of azobisisobutyronitrile as a nonionic initiator, to 10 grams of the core particle dispersion in about 20 grams of water over about 3 hours. The resulting latex is subsequently compacted, annealed, and characterized.

EXAMPLE XIV

The processes of Examples V through VII are repeated except that vinyl spiropyran 6-nitro-spirobenzoindolinopyran-N-ethylsodiumcarboxylate of Example IV is replaced with the non-vinyl-substituted spiropyran 6-nitro-spirobenzoindolinopyran-N-ethylsodiumcarboxylate of Example XIII.

EXAMPLE XV

The process of Examples XIII and XIV is repeated except that the spiropyran 6-nitro-spirobenzoindolinopyran-N-ethylsodiumcarboxylate is replaced with the spiropyran 6-nitrospirobenzoindolinopyran-N-butylpotassium carboxylate prepared as described in Example IIE.

EXAMPLE XVI

The process of Examples XIII and XIV is repeated except that the spiropyran 6-nitro-spirobenzoindolinopyran-N-ethylsodiumcarboxylate is replaced with the spiropyran 6-nitrospirobenzoindolinopyran-N-pentylpotassium carboxylate prepared as described in Example IIF.

EXAMPLE XVII

The process of Examples XIII and XIV is repeated except that the spiropyran 6-nitro-spirobenzoindolinopyran-N-ethylsodiumcarboxylate is replaced with the spiropyran 6-nitro-spirobenzoindolinopyran-N-propyl-triethyl ammoniumsulfonate prepared as described in Example IIIA.

EXAMPLE XVIII

The process of Examples XIII and XIV is repeated except that the spiropyran 6-nitro-spirobenzoindolinopyran-N-ethylsodiumcarboxylate is replaced with the spiropyran 6-nitro-spirobenzoindolinopyran-N-butyl-triethylammonium sulfonate prepared as described in Example IIIB.

EXAMPLE XIX

The processes of Examples XII through XVIII are repeated except that the 0.013 gram of calcium chloride (chelating agent) and the 0.011 gram of calcium chloride (chelating agent) are replaced, respectively, with 0.017 gram of zinc chloride (chelating agent) and 0.013 gram of zinc chloride (chelating agent).

Other embodiments and modifications of the present invention may occur to those of ordinary skill in the art subsequent to a review of the information presented herein;

these embodiments and modifications, as well as equivalents thereof, are also included within the scope of this invention.

The recited order of processing elements or sequences, or the use of numbers, letters, or other designations therefor, is not intended to limit a claimed process to any order except as specified in the claim itself.

What is claimed is:

1. A composition comprising a matrix which comprises particles comprising a core resin and a shell resin thereover, wherein at least one of the core resin and the shell resin contains a chelating agent and a spiropyran compound of the formula

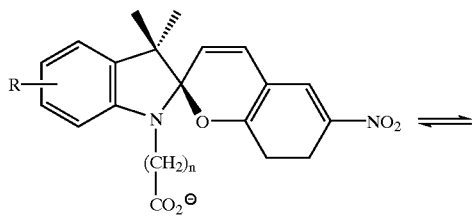

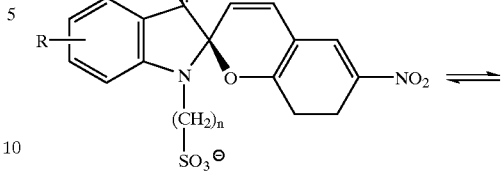

-continued
or

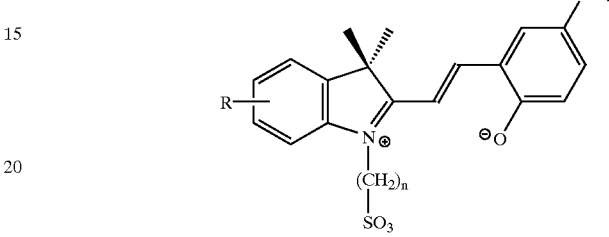

wherein n is an integer representing the number of repeat —CH$_2$— units and R is —H or —CH=CH$_2$, wherein the shell resin is the continuous phase of the matrix, wherein the spiropyran compound can produce changes in the optical and photoactive properties of the resin containing the spiropyran when irradiated.

2. A composition according to claim 1 wherein the spiropyran material is of the formula

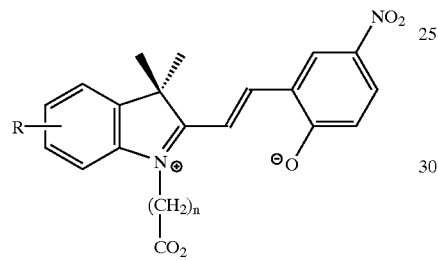

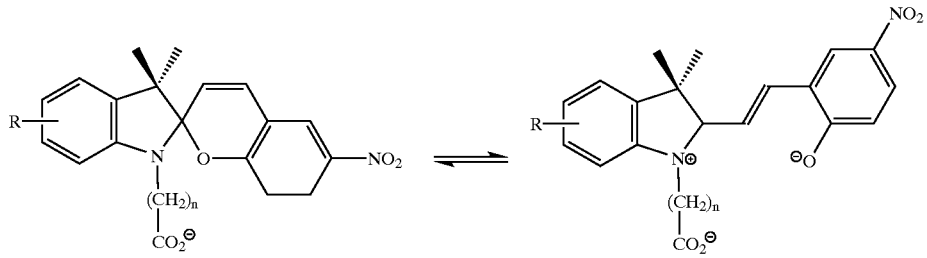

wherein n is an integer of from about 2 to about 8.

3. A composition according to claim 1 wherein the spiropyran material is of the formula

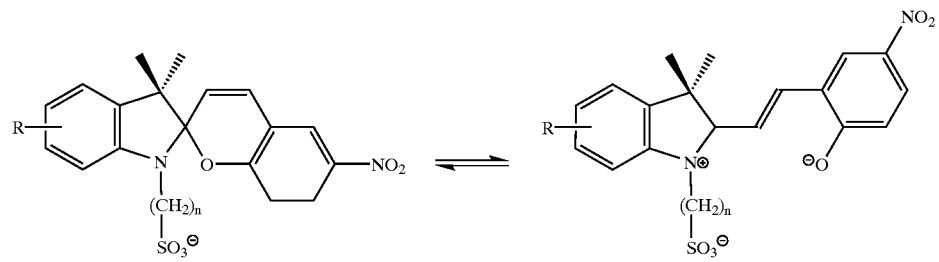

wherein n is an integer of from about 2 to about 8.

4. A composition according to claim 1 wherein the spiropyran material is of the formula

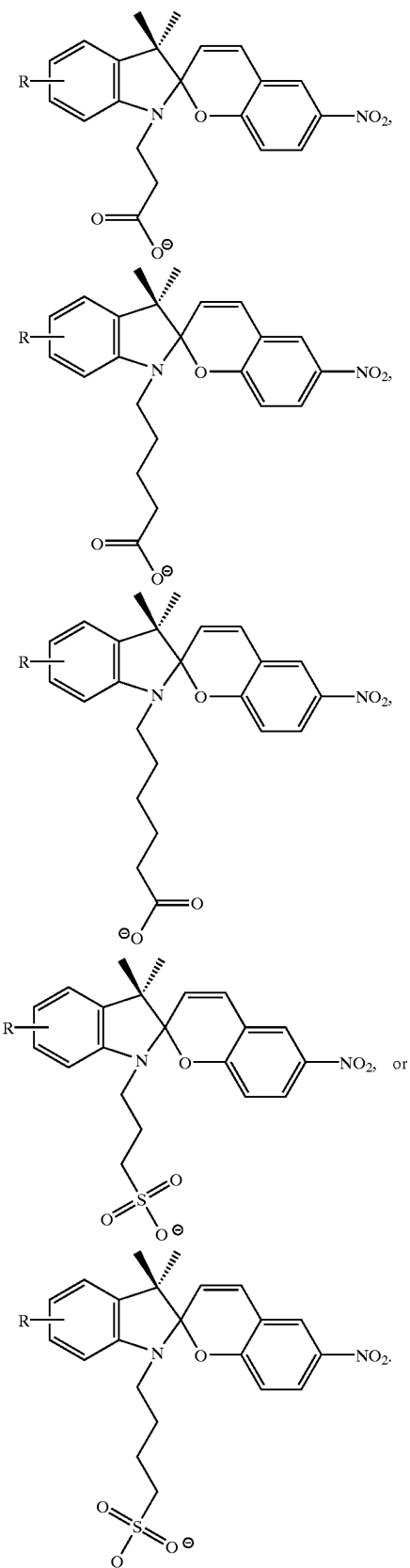

5. A composition according to claim 1 wherein the spiropyran and chelating agent are present in the core resin and not in the shell resin.

6. A composition according to claim 5 wherein the spiropyran is present in the core resin in an amount of at least about 0.01 percent by weight of the core resin.

7. A composition according to claim 5 wherein the spiropyran is covalently bonded to the core resin.

8. A composition according to claim 5 wherein the spiropyran is dispersed within but not covalently bonded to the core resin.

9. A composition according to claim 1 wherein the spiropyran and chelating agent are present in the shell resin and not in the core resin.

10. A composition according to claim 9 wherein the spiropyran is present in the shell resin in an amount of at least about 0.01 percent by weight of the shell resin.

11. A composition according to claim 9 wherein the spiropyran is covalently bonded to the shell resin.

12. A composition according to claim 9 wherein the spiropyran is dispersed within but not covalently bonded to the shell resin.

13. A composition according to claim 1 wherein at least two different spiropyrans are present in the matrix.

14. A composition according to claim 1 wherein spiropyran and chelating agent are present in both the core resin and the shell resin.

15. A composition according to claim 14 wherein a chelating agent and a first spiropyran are present in the core resin, and a chelating agent and a second spiropyran different from the first spiropyran are present in the shell resin.

16. A composition according to claim 1 wherein the chelating agent is a metal salt in the +2 state.

17. A composition according to claim 1 wherein the chelating agent is a salt of calcium, magnesium, zinc, or a transition metal.

18. A composition according to claim 1 wherein the chelating agent is present in an amount relative to the spiropyran material of at least about 1 mole of chelating agent for every 1 mole of spiropyran material.

19. A composition according to claim 1 wherein the chelating agent is present in an amount relative to the spiropyran material of at least about 2 moles of chelating agent for every 1 mole of spiropyran material, and wherein the chelating agent is present in an amount relative to the spiropyran material of no more than about 10 moles of chelating agent for every 1 mole of spiropyran material.

20. A matrix composition which comprises (a) a discrete phase comprising an ordered array of core particles containing a first resin, and (b) an annealed continuous phase comprising a second resin, wherein at least one of the first resin and the second resin contains a chelating agent and a spiropyran compound of the formula

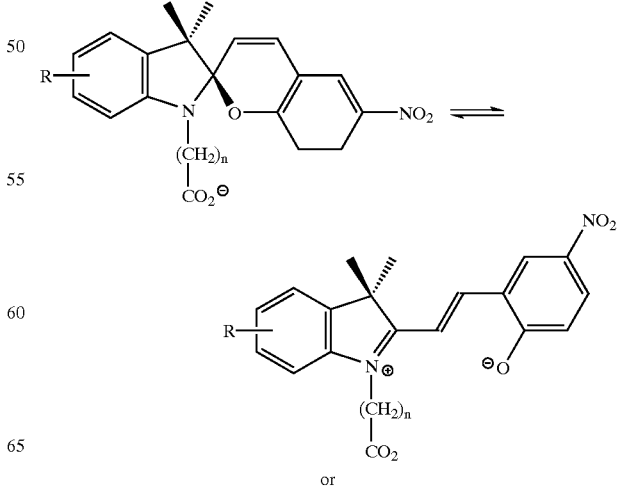

or

-continued

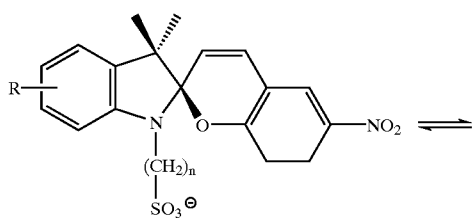

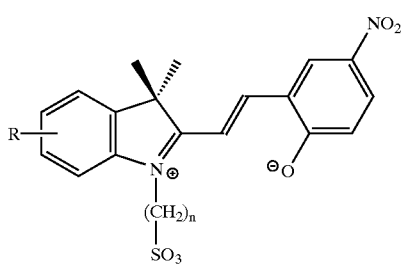

wherein n is an integer representing the number of repeat —CH$_2$— units and R is —H or —CH=CH$_2$, wherein if the spiropyran compound is irradiated then the optical properties of the resin containing the spiropyran compound change.

21. A process which comprises (a) organizing into an array particles comprising a core resin and a shell resin, wherein at least one of the core resin and the shell resin contains a chelating agent and a spiropyran compound of the formula

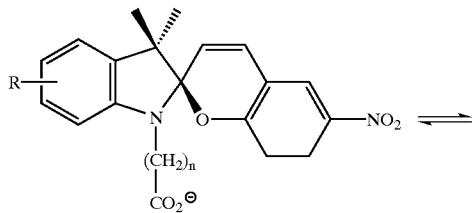

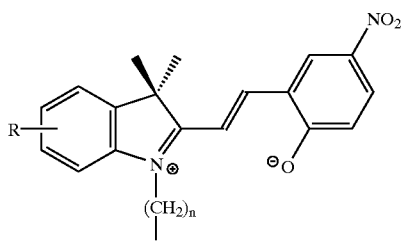

or

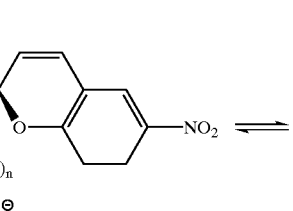

-continued

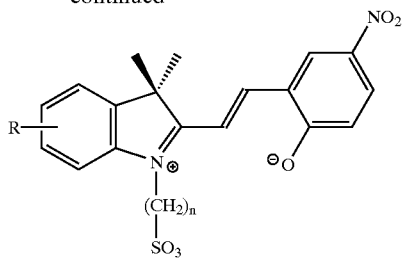

wherein n is an integer representing the number of repeat —CH$_2$— units and R is —H or —CH=CH$_2$; and (b) heating the array to cause the shell resin to melt, partially flow, then harden on cooling, to fix the particles into a storage medium comprising the particles as a discrete phase and the shell resin as a continuous phase.

22. A process which comprises fusing an array of particles comprising a core resin with a shell resin thereover to fix the particles into a matrix, wherein at least one of the core resin and the shell resin contains a chelating agent and a spiropyran compound of the formula

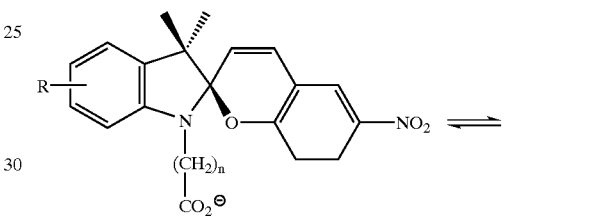

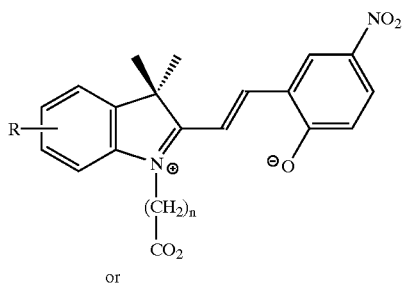

or

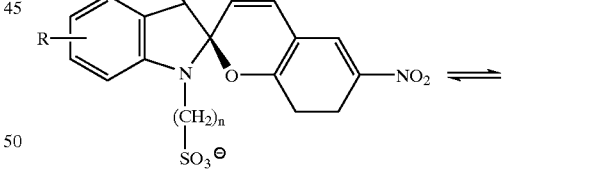

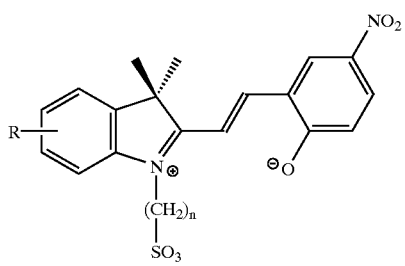

wherein n is an integer representing the number of repeat —CH$_2$— units and R is —H or —CH=CH$_2$, and wherein the core resin comprises a discrete phase and the shell resin comprises a continuous phase of the matrix.

* * * * *